(12) United States Patent
Jubran et al.

(10) Patent No.: US 9,367,360 B2
(45) Date of Patent: Jun. 14, 2016

(54) DEPLOYING A HARDWARE INVENTORY AS A CLOUD-COMPUTING STAMP

(71) Applicant: MICROSOFT CORPORATION, Redmond, WA (US)

(72) Inventors: Marwan E Jubran, Redmond, WA (US); Aleksandr Gershaft, Redmond, WA (US); Damien S Jose, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 499 days.

(21) Appl. No.: 13/715,273

(22) Filed: Dec. 14, 2012

(65) Prior Publication Data

US 2014/0173060 A1    Jun. 19, 2014

(51) Int. Cl.
G06F 15/16    (2006.01)
G06F 9/50    (2006.01)

(52) U.S. Cl.
CPC .......... G06F 9/5072 (2013.01); G06F 9/5061 (2013.01)

(58) Field of Classification Search
CPC .................................................. G06F 9/5072
USPC ....................................................... 709/220
See application file for complete search history.

(56) References Cited

U.S. PATENT DOCUMENTS

| | | | |
|---|---|---|---|
| 7,493,653 B2 | 2/2009 | Klein | |
| 7,746,860 B2 | 6/2010 | Tams et al. | |
| 8,549,869 B1 | 10/2013 | Whitted | |
| 8,625,596 B1 | 1/2014 | Thomas et al. | |
| 8,949,389 B1 * | 2/2015 | Rimmer | ........................ 709/222 |
| 2002/0163901 A1 | 11/2002 | Spratt | |
| 2005/0060413 A1 | 3/2005 | Oyadomari et al. | |

(Continued)

FOREIGN PATENT DOCUMENTS

| | | |
|---|---|---|
| EP | 1250785 | 5/2007 |
| EP | 2339778 A1 | 6/2011 |

(Continued)

OTHER PUBLICATIONS

Final Office Action in U.S. Appl. No. 13/531,136, mailed Jan. 13, 2014, 27 pages.

(Continued)

*Primary Examiner* — Hamza Algibhah
(74) *Attorney, Agent, or Firm* — Ben Tabor; Kate Drakos; Micky Minhas

(57) ABSTRACT

Methods, systems, and computer-readable media for automatically configuring an inventory of hardware to interact seamlessly with a computing fabric of a data center are provided. Initially, a communicative coupling between a user device and computing units of the hardware inventory is established. The communicated coupling allows an engine running on the user device to provision the computing units with software that allows the hardware inventory to function as a fabric-computing cluster (FCC) of the data center. Provisioning involves deploying a computing fabric to the computing units, and deploying core infrastructure services to run on top of the computing fabric. The computing fabric enables the computing units to interact as a unified logical system, while the core infrastructure services represent operating-system-level components that provide underlying support of applications running on the FCC. Upon carrying out the provisioning, the components internal to the computing units of the hardware inventory are validated.

20 Claims, 10 Drawing Sheets

(56) References Cited

U.S. PATENT DOCUMENTS

| | | | |
|---|---|---|---|
| 2005/0216732 A1 | 9/2005 | Kipnis et al. | |
| 2006/0094291 A1 | 5/2006 | Caveney et al. | |
| 2006/0282529 A1 | 12/2006 | Nordin | |
| 2007/0005994 A1 | 1/2007 | Bahali et al. | |
| 2007/0088630 A1 | 4/2007 | MacLeod et al. | |
| 2007/0180059 A1 | 8/2007 | Marl et al. | |
| 2007/0281639 A1* | 12/2007 | Clidaras et al. | 455/128 |
| 2008/0259816 A1 | 10/2008 | Archer et al. | |
| 2009/0210735 A1 | 8/2009 | Brown et al. | |
| 2009/0276771 A1* | 11/2009 | Nickolov et al. | 717/177 |
| 2010/0107015 A1* | 4/2010 | Bernabeu-Auban et al. | 714/38 |
| 2010/0131948 A1* | 5/2010 | Ferris | 718/1 |
| 2010/0153482 A1 | 6/2010 | Kim et al. | |
| 2010/0211656 A1 | 8/2010 | Pagan et al. | |
| 2010/0235484 A1 | 9/2010 | Bolan et al. | |
| 2011/0022245 A1 | 1/2011 | Goodrum et al. | |
| 2011/0072255 A1* | 3/2011 | Gopalakrishnan et al. | 713/2 |
| 2011/0078680 A1 | 3/2011 | Lagergren et al. | |
| 2011/0145392 A1 | 6/2011 | Dawson et al. | |
| 2011/0172841 A1 | 7/2011 | Forbes, Jr. | |
| 2011/0231822 A1 | 9/2011 | Sabin et al. | |
| 2011/0270962 A1 | 11/2011 | Tameshige et al. | |
| 2011/0295633 A1 | 12/2011 | Bird | |
| 2011/0296069 A1 | 12/2011 | Tarta et al. | |
| 2011/0320849 A1 | 12/2011 | Cochran et al. | |
| 2012/0102186 A1 | 4/2012 | Rewaskar et al. | |
| 2012/0151040 A1 | 6/2012 | Mouravyov et al. | |
| 2012/0209981 A1 | 8/2012 | Bolan et al. | |
| 2012/0303767 A1 | 11/2012 | Renzin | |
| 2012/0311111 A1 | 12/2012 | Frew et al. | |
| 2013/0007737 A1 | 1/2013 | Oh et al. | |
| 2013/0046884 A1 | 2/2013 | Frost et al. | |
| 2013/0120929 A1* | 5/2013 | Bianculli et al. | 361/679.46 |
| 2013/0132607 A1* | 5/2013 | Sinha et al. | 709/238 |
| 2013/0198346 A1* | 8/2013 | Jubran et al. | 709/220 |
| 2013/0346260 A1* | 12/2013 | Jubran et al. | 705/28 |
| 2014/0039683 A1* | 2/2014 | Zimmermann et al. | 700/275 |
| 2014/0059945 A1* | 3/2014 | Gardner et al. | 52/64 |
| 2014/0059946 A1* | 3/2014 | Gardner et al. | 52/64 |
| 2014/0068057 A1 | 3/2014 | Burchfield et al. | |
| 2014/0101467 A1* | 4/2014 | Jubran et al. | 713/310 |
| 2014/0119238 A1 | 5/2014 | Thomas et al. | |
| 2014/0298734 A1* | 10/2014 | Rogers | 52/79.9 |

FOREIGN PATENT DOCUMENTS

| | | |
|---|---|---|
| EP | 2362578 A1 | 8/2011 |
| GB | 2421153 A | 6/2006 |
| WO | 2010119370 A1 | 10/2010 |
| WO | 2011151773 A1 | 12/2011 |
| WO | WO 2011159842 | 12/2011 |

OTHER PUBLICATIONS

International Search Report and Written Opinion in PCT/US2013/046670, mailed Oct. 9, 2013, 10 pages.

International Search Report and Written Opinion in PCT/US2013/060244, mailed Feb. 4, 2014, 16 pages.

International Search Report & Written Opinion for PCT Patent Application No. PCT/US2013/074742, Mailed Date: Apr. 4, 2014, Filed Date: Dec. 12, 2013, 14 Pages.

"Configuring the Hardware and Software Inventory SMS Feature", Retrieved on: Dec. 30, 2011, 6 pages Available at:http://www.tech-faq.com/configuring-the-hardware-and-software-inventory-sms-feature.html.

"Just Released: StockTrader 5.0, Windows Azure Platform End-to-End Sample Application", Published on: Jun. 30, 2011, 1 page Available at:http://blogs.msdn.com/b/windowsazure/archive/2011/06/30/just-released-stocktrader-5-0-windows-azure-platform-end-to-end-sample-application.aspx.

"System Imaging", Retrieved on: Jul. 20, 2011, 2 pages Available at:http://itservices.stanford.edu/strategy/sysadmin/imaging.

"Understanding Systems Management Server (SMS)", Retrieved on: Dec. 29, 2011, 11 pages, Available at:http://www.tech-faq.com/understanding-systems-management-server-sms.html.

Bourgeau, Paul, "Cloud Security: Managing the Cloud with Windows Intune", Published on: Jun. 2010, 6 pages, Available at:http://technet.microsoft.com/en-us/magazine/ff742836.aspx.

Casado, et al., "Ripcord: A Modular Platform for Data Center Networking", In Proceedings of the ACM SIGCOMM 2010 conference on SIGCOMM, Jun. 7, 2010, 15 pages.

International Search Report and Written Opinion in PCT/US2013/022358, mailed Jun. 21, 2013.

Mudigonda, et al., "NetLord: A Scalable Multi-tenant Network Architecture for Virtualized Datacenters", Published on: Aug. 15-19, 2011, 12 pages Available at:http://www.hpl.hp.com/personal/Praveen_Yalagandula/papers/SIGCOMM2011-NetLord.pdf.

Non Final Office Action in U.S. Appl. No. 13/531,136, mailed May 8, 2013.

Non-Final Office Action mailed May 12, 2014 in U.S. Appl. No. 13/360,876, 19 pages.

Non-Final Office Action dated Jul. 31, 2014 in U.S. Appl. No. 13/531,136, 13 pages.

Non-Final Office Action dated Aug. 13, 2014 in U.S. Appl. No. 13/647,116, 29 pages.

Final Office Action dated Dec. 9, 2014 in U.S. Appl. No. 13/360,876, 21 pages.

Second Written Opinion of the International Searching Authority dated Dec. 19, 2014 in Application No. PCT/US2013/074742, 10 pages.

Final Office Action dated Feb. 10, 2015 in U.S. Appl. No. 13/531,136, 15 pages.

Notice of Allowance dated Mar. 4, 2015 in U.S. Appl. No. 13/647,116, 9 pages.

Perera, et al., "A Scalable and Robust Coordination Architecture for Distributed Management", In Department of Computer Science Technical Report TR-659, Indiana University, 2008, 10 pages.

"Windows Azure Bootstrapper", Retrieved on: Dec. 28, 2011, 2, pages Available at: http://bootstrap.codeplex.com/.

Hirschfeld, et al., "Bootstrapping OpenStack Clouds", Retrieved on: Dec. 28, 2011, 15 pages Available at: http://www.rackspace.com/downloads/pdfs/dell_tech_wp-bootstrapping_openstack_clouds_v2.pdf.

"Bootstrapping Applications via AWS CloudFormation", Retrieved on: Dec. 28, 2011, 22 pages Available at: https://s3.amazonaws.com/cloudformation-examples/BoostrappingApplicationsWithAWSCloudFormation.pdf.

"Vyatta Network OS for Cloud Computing", Retrieved on: Dec. 28, 2011, 3 pages Available at: http://www.vyatta.com/sites/vyatta.com/files/pdfs/vyatta_cloud_datasheet.pdf.

"Supplementary Search Report Issued in European Patent Application No. 13743254.8", Mailed Date: May 29, 2015, 5 Pages.

European Office Action dated May 18, 2015 in European Patent Application No. 13771681.7, 2 pages.

European Office Action dated Mar. 3, 2015 in EP Application No. 13734578.1, 2 pages.

International Preliminary Report on Patentability dated Mar. 23, 2015 in PCT Patent Application No. PCT/US2013/074742, 18 Pages.

International Search Report & Written Opinion Issued in PCT Application No. PCT/US2015/051291, Mailed Date: Oct. 23, 2015, 13 Pages.

StruxureWareTM Data Center Operation, Retrieved on: Jul. 4, 2014, Available at: http://www2.schneider-electric.com/documents/solutions/struxureware/StruxureWare-data-center-operation_RMCR-8N2PLE_R7_EN.pdf.

* cited by examiner

DEPLOYING A HARDWARE INVENTORY AS A CLOUD-COMPUTING STAMP

CROSS-REFERENCE TO RELATED APPLICATIONS

This application is related in subject matter to U.S. patent application Ser. No. 13/360,876, filed Jan. 30, 2012, now pending, entitled "AUTOMATED BUILD-OUT OF A CLOUD-COMPUTING STAMP," herein incorporated by reference.

BACKGROUND

Generally, distributed service applications are hosted in cloud-computing networks (across various nodes) and are intended primarily to promote high availability through redundancy of service-application components, dynamic scalability, and auto-healing functionality. These service applications are often divided into portions that include a group of service-application components. These service-application components may be hosted throughout nodes (e.g., physical machines and virtual machines) of one or more data centers. Often, there exists a need to create or expand the computing/storage capacity of these data centers to accommodate usage demands of the service applications and to help ensure that an entire service application does not become unavailable due to a lack of support from the underlying hardware.

Expansion of the data centers may involve various scenarios, such as configuring a new set of hardware or reconfiguring an existing set of hardware to operate in concert with the existing nodes within the data centers. In one example, a new set of racks that each accommodates a plurality of blades may be targeted for being integrated within a fabric that interconnects the data center nodes. This fabric helps ensure that the service-application components distributed across the existing nodes and the newly added hardware such as racks, network devices (L2/3 switches, routers, load balancers), power and serial devices, and blades are able to interact as if each service application was running on its own independent computing device.

When conducting an expansion of a data center, the steps for integrating the new set of hardware into the fabric are presently manually conducted. These manually conducted steps are often time-consuming, ineffective, and inconsistent in result, thus, potentially leading to service interruptions within the fabric. Accordingly, an automated end-to-end process that builds out a set of designated hardware for deployment into a fabric would help achieve an efficient, robust, and scalable framework for expanding the computing/storage capacity of a data center.

SUMMARY

This Summary is provided to introduce concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, and computer storage media for carrying out an automated bootstrap process that, upon verifying a physical topology of an inventory of non-configured hardware, integrates and deploys the hardware inventory as a fabric-computing cluster (FCC) within a cloud-computing fabric of a data center. The automated manner in which the bootstrap process is implemented avoids the problematic fallout (discussed above) that precipitates from manually executed procedures for reconfiguring or adding capacity to a data center. Accordingly, in embodiments of the present invention, the automated bootstrap process enables incorporating the hardware inventory into the cloud-computing fabric in a consistent and effective fashion.

In general, the bootstrap process is triggered upon receiving an indication to create or expand computing/storage capacity of a data center. In embodiments, the data center includes a plurality of nodes (e.g., physical machines or virtual machines), network devices, serial devices, power devices, and other equipment that are operably interconnected and managed via the cloud-computing fabric. The fabric provides underlying support for service applications that are distributed throughout the data centers. In particular, portions (e.g., roles instances or program components) of these service applications that are distributed throughout nodes may be managed by a controller of the fabric. The fabric controller is generally responsible for various duties surrounding the monitoring, maintenance, and management of the health of computer resources, network gear, serial devices, and power units that support the underlying functionality of the fabric.

In an exemplary embodiment, the bootstrap process is performed in independent phases upon being triggered by an event (e.g., call to expand capacity of the data center). These phases are carried out by executing self-contained workflows, respectively, and are generally depicted in FIG. 2. Initially, a coauthoring phase may be conducted for specifying an initial set up of an inventory of hardware. This phase involves a workflow for implementing one or more of the following processes: receiving a customer's dependency schema that specifies the additional capacity required on the customer's premises; identifying the hardware that meets the dependency schema; interfacing with the customer to gather values for configuring the identified hardware; generating a symbolic representation from the values; validating configuration using the symbolic representation upon delivery of the hardware; and preparing a template file that memorializes a layout of the topology.

Upon preparing the template file, the phases that involve discovery and validation of network devices and hardware devices may be commenced. The workflows for performing discovery and validation for each of these devices generally involve user device(s) that communicate with the network devices via network-based connection and/or a serial-based connection to discover a physical topology (e.g., inter-rack locations and a wiring arrangement) surrounding the hardware devices. These user device(s) may cross-reference the discovered physical topology against the template file to validate the hardware devices. Once the physical/logical topology configuration is fully generated, the deployment of a new fabric instance, or the expansion of an existing fabric instance can commence. It should be noted that the deployment of a new fabric instance or the expansion of an existing fabric instance can involve or be atop a portion of hardware in a given data center(s) or data center container.

Next, the user device(s) may initiate communication with a cloud-computing fabric of a data center to effectuate the phases that deploy the hardware inventory within the fabric of the data center as a fabric-computing cluster (FCC) and provision security on the FCC. These phases involve various workflows that support setting up the hardware cluster to interact with resources and existing hardware within the data center. In addition, these workflows may include the following steps: preparing an infrastructure state from information gathered upon verifying the physical topology of the hardware inventory; integrating the hardware inventory within the fabric of the data center by sharing the infrastructure state with a fabric controller; deploying services running on the fabric within the hardware inventory; and designating the hardware inventory as a data center FCC. Accordingly, when carried out in succession, these phases of the bootstrap process promote end-to-end automation for building out a hardware inventory and for integrating the hardware inventory within a fabric of a data center. This end-to-end automation may further achieve an efficient, robust, and scalable framework either within the hardware inventory preestablished within the data center (e.g., reconfiguring an existing FCC to represent a new FCC instance within the data center), or at a site external to the data center (e.g., integrating a remote hardware inventory as a new FCC instance within the data center).

BRIEF DESCRIPTION OF THE DRAWINGS

Embodiments of the present invention are described in detail below with reference to the attached drawing figures, wherein.

DETAILED DESCRIPTION

Figure 1:
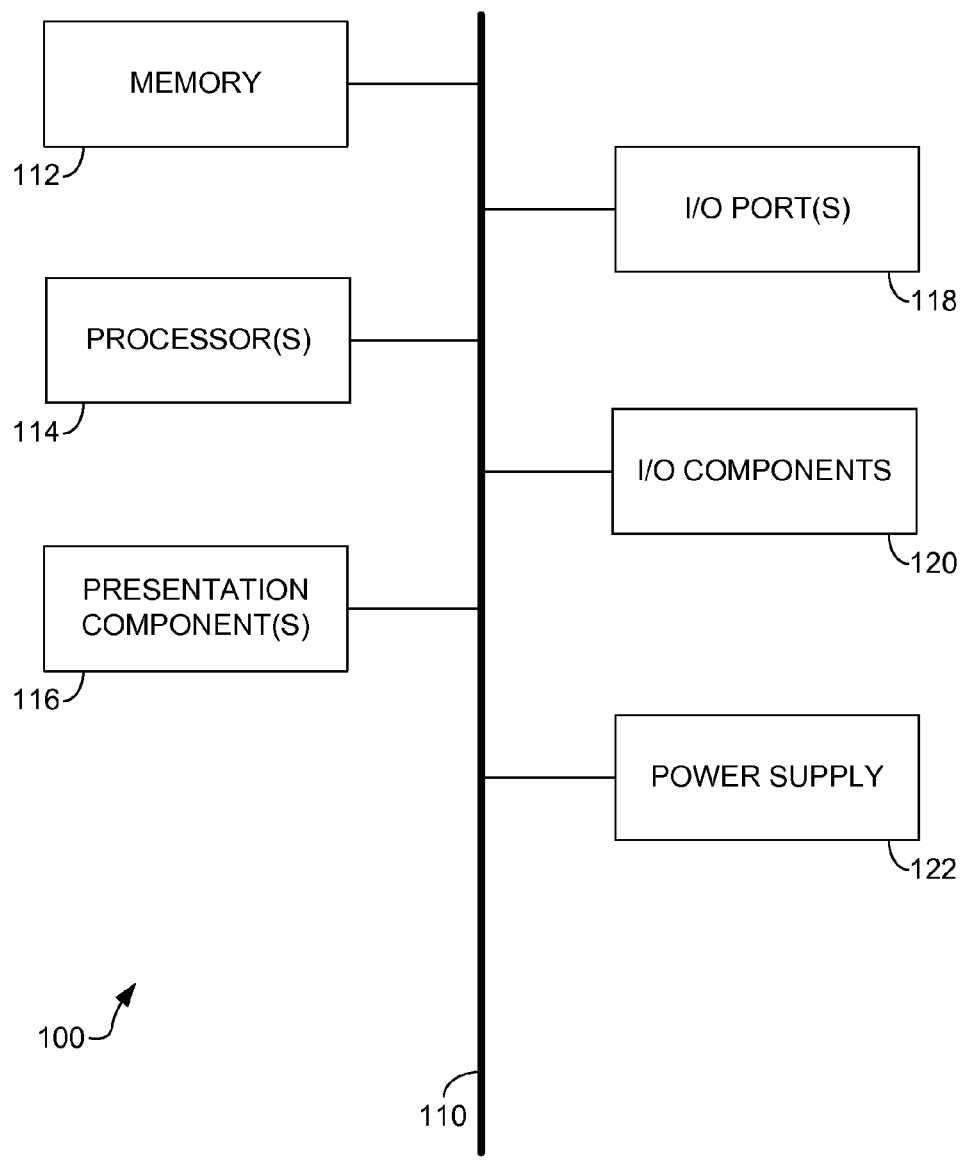
FIG. 1 is a block diagram of an exemplary computing environment suitable for use in implementing embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Aspects of the invention focus upon two related phases within an overall bootstrap process, where the bootstrap process is designed to achieve an efficient, robust, and scalable framework to incorporate a cloud operating system (Windows Azure) on designated hardware regardless of the location. These related phases are the following: deploying a hardware inventory as a fabric-computing cluster (FCC) within a cloud-computing fabric of a data center; and provisioning security on the FCC. These two phases of the bootstrap process are often conducted after a discovery and validation phase, which involves the discovery, validation, and configuration of network devices and computer hardware as part of initial build out of a hardware inventory and a device return manufacture authorization (RMA) scenario. In one particular instance, the workflows associated with the discovery, validation, and configuration for each of these elements rely, in part, on the information (e.g., expected topology description) previously gleaned from a previously conducted coauthoring phase of the bootstrap process. The workflows of the coauthoring phase, the discovery-validation-configuration phase, and the two phases discussed herein may be carried out by the same ecosystem. This ecosystem generally involves a user device (e.g., mobile device, laptop, or utility box) that is in communication (e.g., serial and/or network connections) with the hardware inventory in order to perform deployment of the hardware inventory as the FCC and provisioning of security on the FCC before, during, or after deployment.

As discussed more fully below, embodiments of this invention introduce technology within a cloud-computing fabric to automatically deploy software on the inventory of hardware in order to eventually merge that hardware inventory as an FCC within a data center. As used herein, the phrase "hardware inventory" is not meant to be limited to any particular configuration of components, but broadly refers to any compilation of devices (e.g., network devices, computing devices, and power-supply devices) that may be eventually integrated within the fabric. In one instance, the hardware inventory may be located within a private enterprise network managed by a customer of a cloud-computing-network service provider, where implementing the bootstrap process as an appliance on this type of hardware inventory allows for remote reachability between the data center and the private enterprise network. In another instance, the hardware inventory may be located within the data center managed by the cloud-computing-network service provider, where implementing the bootstrap process allows for building out local storage/computing capacity of the data center.

In an exemplary embodiment, the hardware inventory represents a system that is comprised of any number of the following: network gear (e.g., switches, routers, and load balancers) power devices, serial devices, blade(s) (e.g., computing and/or storage devices), and components within the blade(s) (e.g., BIOS, device drivers, and firmware). Accordingly, various systems may be categorized as the hardware inventory, and the phrase hardware inventory is not limited to the exemplary systems described herein.

Further, the hardware inventory may be equipped to communicate with external device(s) (e.g., laptop configured to run and manage the bootstrap process of the hardware inventory) and/or internal device(s) (e.g., blades for performing compute and storage operations) via one or more channels. These channels may include a management channel ("serial communication channel") and one or multiple network-based channel(s) ("network communication channel"). The serial communication channel represents an out-of-band connection that provides a hook-up between the hardware inventory (e.g., blades on racks) and a set of serial devices (e.g., Digi® connector device). Typically, serial management of the hardware inventory (e.g., accessing and verifying the blades on the rack) over the serial communication channel is conducted before setting up the networking capability on each of the blades on the rack. The network communication channel represents an in-band connection for providing a network link between the external and/or internal devices of the hardware inventory with various network locations. For example, the network communication channel may include network-management Ethernet wires that use in-band signaling to exchange call-control information. The two channels may be implemented using the same medium (e.g. Ethernet) depending on the hardware configuration.

As will be discussed more fully below, the bootstrap process features end-to-end automation using one or more workflow engines (running on a user device 310 of FIGS. 3 and 8) that drive the orchestration and execution of various phases comprising the bootstrap process. In embodiments, these phases can be carried out as independent workflows such that each phase may be invoked and driven to completion separately without reliance on concurrent operation of another phase or workflow. By allowing the phases to be carried out independently in a self-contained manner, each phase consistently delivers incremental improvements to hardware inventory without any adverse interactions of previous or subsequent workflows.

As will be apparent in the following discussion, a majority of the discussion below will focus on the workflows surrounding the hardware-inventory deployment and security provisioning phases of the bootstrap process, where the workflows support setting up the hardware inventory within a cloud-computing platform. In operation, these workflows are designed to achieve the various goals of these two phases, such as deploying the core infrastructure services (e.g., fabric and storage) on the hardware inventory such that it behaves as an FCC within a cloud-computing fabric of a data center. One goal of the workflows is to provision security on the hardware inventory. Another goal of the workflows is to configure the fabric within the data center with information concerning the hardware inventory. Yet another goal of the workflows is to conduct cluster-wide validation of the hardware inventory upon deployment. Generally, cluster-wide validation occurs once the core infrastructure services are provisioned onto the hardware inventory and the hardware inventory is deployed into the fabric of the data center. Cluster-wide validation is employed to verify the services are live, accessible, and fully operational.

Still another goal of the workflows is to configure devices of the hardware inventory with production settings (e.g., credentials and protocol data). Upon configuring the device with production settings, the production settings are confirmed. Further, the network configuration of the hardware inventory is established, which allows for access to or network connectivity with the servers via one or more switches. Improper network configurations, which are being detected and cured by the workflows, typically prevent expected interaction with the servers even when the wiring surrounding the servers is correct (e.g., data packets will not properly traverse network connections from the switches to the servers).

Yet another goal of the two phases is to verify that the configuration and functionality of the servers and their components match against a predefined template file. The template file may be prepared, in part, using the SKU definition developed/generated during the coauthoring phase or hardware SKU certification phase of the bootstrap process. The SKU definition is discussed in greater detail in U.S. application Ser. No. 13/531,136, filed Jun. 22, 2012, now pending, entitled "Establishing an Initial Configuration of a Hardware Inventory," herein incorporated by reference. The template file may be used to verify that the wiring internal to the hardware inventory (e.g., connections between servers, serial access devices, and PDUs) and, potentially, external to the hardware inventory (e.g., connections between serial aggregators) is as expected by conducting wire checks to verify physical connections between devices. This verification of the physical topology of the hardware inventory, conducted during the discovery and validation phase of the bootstrap process, is discussed in greater detail in U.S. application Ser. No. 13/647,116, filed Oct. 8, 2012, now pending, entitled "Discovering, Validating, and Configuring Hardware-inventory Components," herein incorporated by reference.

Having briefly described an overview of embodiments of the present invention, an exemplary operating environment suitable for implementing embodiments of the present invention is described below.

Operating Environment

Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular abstract data types. The invention may be practiced in a variety of system configurations, including handheld devices, consumer electronics, general-purpose computers, specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and nonremovable media. By way of example, and not limitation, computer-readable media may comprise computer storage media and communication media. Computer storage media include volatile and nonvolatile, removable and non-removable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium, which can be used to store the desired information and which can be accessed by computing device 100. Communication media typically embody computer-readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disk drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Phases of the Bootstrap Process

Figure 2:
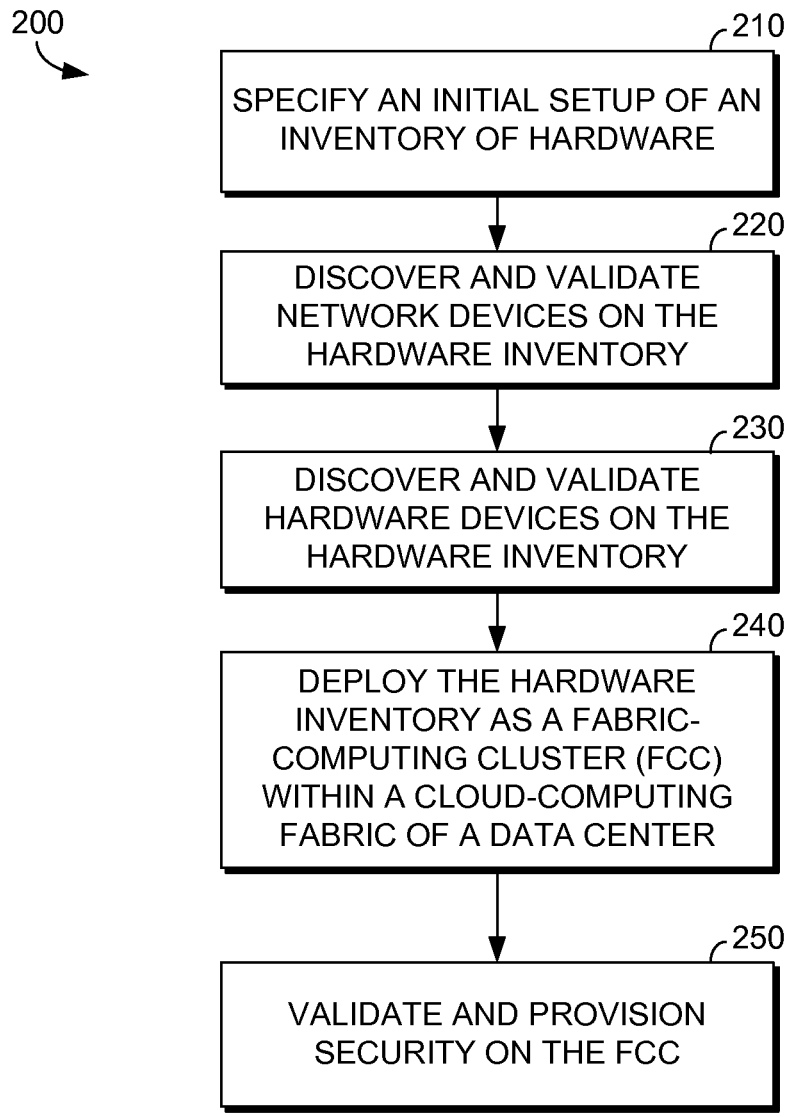
FIG. 2 is a flow diagram showing exemplary phases of a bootstrap process for incorporating an inventory of hardware into a fabric-computing cluster (FCC) of a data center, in accordance with an embodiment of the present invention.

Turning to FIG. 2, a general discussion of the individual phases of the bootstrap process for establishing interoperation between an inventory of hardware and a cloud-computing fabric of a data center will now be discussed. Generally, FIG. 2 illustrates a flow diagram 200 that shows five exemplary phases of a bootstrap process for incorporating the hardware inventory into the fabric of a data center, in accordance with an embodiment of the present invention. In embodiments, building out the hardware inventory as a fabric-computing cluster (FCC) using the phases discussed below may be carried out by a configuration software (see reference numeral 311 of FIG. 3) on a user device (see reference numeral 310 of FIG. 3). The user device, along with the hardware inventory, data center, and/or other network device, acts in concert to form various ecosystems that implement one or more phases of the bootstrap process.

Returning to FIG. 2, as depicted at block 210, the first phase of the bootstrap process includes a workflow for specifying an initial set-up of the hardware inventory. Generally, the workflow results in generating the logical/physical configuration needed to deploy the fabric network between blocks 230 and 240. During the first phase, the workflow may involve gaining an understanding about an initial configuration of the hardware inventory before releasing the hardware inventory as an FCC of the data center. For instance, the first-phase workflow may attempt to validate the initial configuration of the hardware inventory to ensure it corresponds with an expected hardware layout (e.g., device locations, IP addresses, VLANs, and wiring) and to ensure it meets certain regulations enforced by the data center (e.g., flagged unsecure components are absent and desirable communication components are present).

In an exemplary embodiment, the workflow of the first phase is concerned with verifying that the initial logical resources and the appropriate specification of those resources match a supported configuration. One instance of verifying may involve determining whether there are sufficient network resources (e.g., IP addresses, VLANs, ports, and the like) provided in the configuration to match the desired configuration articulated by the specification. For example, the first-phase workflow may verify that at least one IP address is provided per machine if such a condition exists within the specification.

Another instance of verifying may involve determining whether there exists an overlap of the configuration with known existing ranges (e.g. accidentally provided resources that are presently in use). Yet another instance of verifying may involve determining whether the planned set of resources constitutes a supported configuration (e.g., are there enough of each required resource to meet the specification, is the combination of these type of resources supported, is the detected TOR switch compatible with the detected blades). Still another instance of verifying involves determining whether interaction with the end-user/customer is needed to gather resources required for the execution (e.g., passwords, addresses, IP blocks, VLANs, and the like).

As depicted at block 220, a second phase for discovering and validating network devices and wiring checks may be implemented on the hardware inventory. In embodiments, the workflow of the second phase may involve communicating with a top-of-rack (TOR) switch and a serial-access device of the network devices via a serial-based connection and a network-based connection, respectively. Further, the second-phase workflow may involve sending instructions over one or more of the connections that prompt the TOR switch and/or the serial-access device to selectively induce hardware devices (e.g., processors, processing units, computing devices, servers, and blades inserted into a rack) to send traffic to the user device for analysis and may involve the use of a power distribution unit (PDU) to selectively power-cycle the devices to reset their state. This analysis may include discovering and validating the hardware devices, as depicted at block 230. That is, the third phase of the bootstrap process employs data packets that are carried from the hardware devices to the user device. A workflow of the third phase may involve parsing the content (e.g., payload and header) of the data packets to determine the location or absence of, configuration of, and internal connections to the hardware devices.

In embodiments, the third-phase workflow may also send/inject specific workflows, tools, etc. to the various devices and/or blades to perform validation, update and/or configuration of hardware and/or software components (e.g., BIOS and device firmware) within the devices/blades themselves. In other embodiments, the workflow of the third phase may execute "smoke tests," which serve to verify that components with the devices/blades are functional and meet the fabric requirements. Further, the third-phase workflow may identify the model, manufacturer, and firmware version of devices/blades for recordation and eventual use.

As depicted at block 240, the fourth phase of the bootstrap process involves deploying the inventory as an FCC instance within the fabric of the data center. In an exemplary embodiment, the fourth-phase workflow may involve sharing with the fabric an infrastructure state of the hardware inventory (e.g., generated during at least one of the previous phases) and installing services on the hardware inventory that allow for interaction with the fabric. Installing services onto the hardware inventory may correspond with one of multiple scenarios, which are discussed more fully below. As depicted at block 250, the fifth phase of the bootstrap process involves cluster-wide validation and provisioning of the security measures on the hardware inventory once it is designated as an FCC instance. In an exemplary embodiment, the fifth-phase workflow may involve passing data (e.g., device credentials, original certificates, private keys, and passwords) between a secret store associated with the new FCC instance and a controller of the fabric.

Although five distinct phases of the bootstrap process have been described, it should be understood and appreciated that other types of suitable arrangements of workflows that help advance the incorporation of the hardware inventory within a fabric of a data center may be used, and that embodiments of the present invention are not limited to the five phases described herein. For instance, embodiments of the present invention contemplate dividing a workflow of an individual phase (e.g., phase five) into separate workflows (e.g., cluster-wide validation and security provisioning) that can be performed in a mutually exclusive fashion.

Examples of the multiple scenarios for installing services onto the hardware inventory will now be described. In one scenario, the hardware inventory represents equipment that is new to the data center and that is not previously configured. Accordingly, the new hardware is configured to operate transparently with existing resources of the data center and is cleanly integrated within the data center as a new FCC instance or cloud-computing stamp that is managed by a controller of the cloud-computing fabric.

In another scenario, the hardware inventory represents a local extension of the data center that is added upon the data center requesting additional storage/computing capacity. The local extension may include a rack of blades that build out to allow for management by a fabric controller. In embodiments, the process of building out involves discovering a wiring pattern of the blades within the rack, validating the wiring pattern against a predefined template file, and approving the blades for incorporation into the data center. In effect, building out the blades helps to ensure that any latent wiring issues or hardware issues (e.g., physical defects missing parts, invalid versions of parts, or improper configuration) within the rack are detected and addressed, thereby ensuring that incorporation of the blades within the data center will not adversely impact the live underlying support being offered by the data center to services running thereon.

In yet another scenario, the hardware inventory is configured with its own instance of a cloud-computing fabric that is separate and partitioned from the fabric currently intercoupling resources of the data center. Thus, upon incorporation of the hardware inventory into the data center, the data center will run at least two cloud-computing fabrics (e.g., operating systems) that function to isolate services assigned to the newly bootstrapped hardware inventory from services assigned to the original data center. In this way, separate fabrics may be dedicated to services of particular customers, thereby virtually and physically excluding/protecting some services from others within the data center (e.g., build-out/bootstrap in a data-center container).

In still another scenario, referred to as a return manufacture authorization (RMA) scenario, the hardware inventory represents computing device(s) or other devices (e.g., network, PDU, and serial) that are deemed unreachable (e.g., inoperable or disconnected) by the controller of the fabric of the data center (hereinafter "fabric controller"). During lifecycle management of hardware, the fabric controller may periodically solicit a status of computing devices (e.g., physical machines and/or virtual machines) aggregated within the data center. Soliciting the status may involve communicating requests to agents running on the computing devices, respectively, and receiving health information in return. If the fabric controller is unable to reach a particular computing device for any reason (e.g., a network device that interconnects the computing device to the fabric controller fails), the fabric controller can raise an alert that indicates the hardware inventory is unreachable.

Upon recognizing the hardware inventory as unreachable, the fabric controller may initiate an auto-healing procedure. In embodiments, the auto-healing procedure includes at least the steps of evacuation and validation, where validation is often carried out within one or more phases of the bootstrap process as well. The step of evacuation may involve transferring services (e.g., customer-owned applications and system-based applications) consuming resources on the unreachable hardware inventory to a replacement hardware inventory. As such, evacuation ensures that the auto-healing procedure is transparent to the customers of the data center because the visibility to their services is not impacted during validation and maintenance.

Once the evacuation is successfully performed, the step of validation is invoked. In an exemplary embodiment, the step of validation includes carrying out a workflow of the bootstrap process that verifies configuration settings of components residing within the unreachable hardware inventory and cross-references a detected physical topology (e.g., links between components and wiring between devices) of the unreachable hardware inventory against an expected physical topology (e.g., provided within the template file) of the reachable hardware inventory. In embodiments, such validation may occur via the out-of-bound channel if the unreachable hardware/device is inaccessible via the in-band channel. As such, the step of validation determines whether the unreachable hardware inventory is properly configured to interact with drivers of the fabric controller, where the drivers are designed to interact with specific hardware configurations.

As more fully discussed below, the step of validation involves taking the unreachable hardware inventory offline, which is one reason for conducting the step of evacuation beforehand. It should be noted that evacuation is typically employed when real services are running on the impacted hardware. RMA during bootstrap does not typically involve the step of evacuation; however, RMA of hardware of a running live fabric does involve the step of evacuation for impacted role instances of a service, for cleanup of customer data from unreachable hardware/prep for OEMs/Operators to access and investigate, and for quarantine of unreachable hardware from reuse until issues are resolved.

Generally, the unreachable hardware inventory is taken offline because several destructive actions occur that would interrupt the execution of services on devices of the unreachable hardware inventory and/or on devices of the data center. These destructive actions may include one or more of the following: manipulating a flow of power (e.g., turning on and off) to hardware (e.g., blades, power units, serial devices/ network device(s)) by requesting a serial-access device to selectively drive a power (via a PDU) thereto; gathering information from traffic sent from the manipulated blade; extracting information (e.g., MAC address of the blade) from content of data packets sent within the traffic; and verifying the location and wiring of the blade by evaluating the extracted information against the template file and performing validations. It should be noted that the serial-access device is typically used for out-of-band communication, while the top-of-rack (TOR) switch employs in-band communication (e.g., via the Ethernet).

In an example of selectively driving power to the blade, the fabric controller may turn off power to a range of ports that feed the blades of the unknown/invalid hardware inventory. Next, the fabric controller may directly or indirectly instruct the PDU to turn on power to a selected port that links to a subject blade. The fabric controller may then read the MAC address from data packets being sent from the subject blade that is currently sending traffic. Thus, connectivity of the subject blade is verified when the selected port corresponds with an expected port of the template file. Beyond verifying the selected port for receiving power from the PDU, the step of validation may further involve using a TOR switch to determine which port—within a range of ports allocated to blades of the hardware inventory—is connected to the subject blade. This determination is made by identifying a subject port of the port range that is receiving the data packets being delivered from the subject blade.

Introduction of the Deployment and Provisioning Phases

Figure 3:
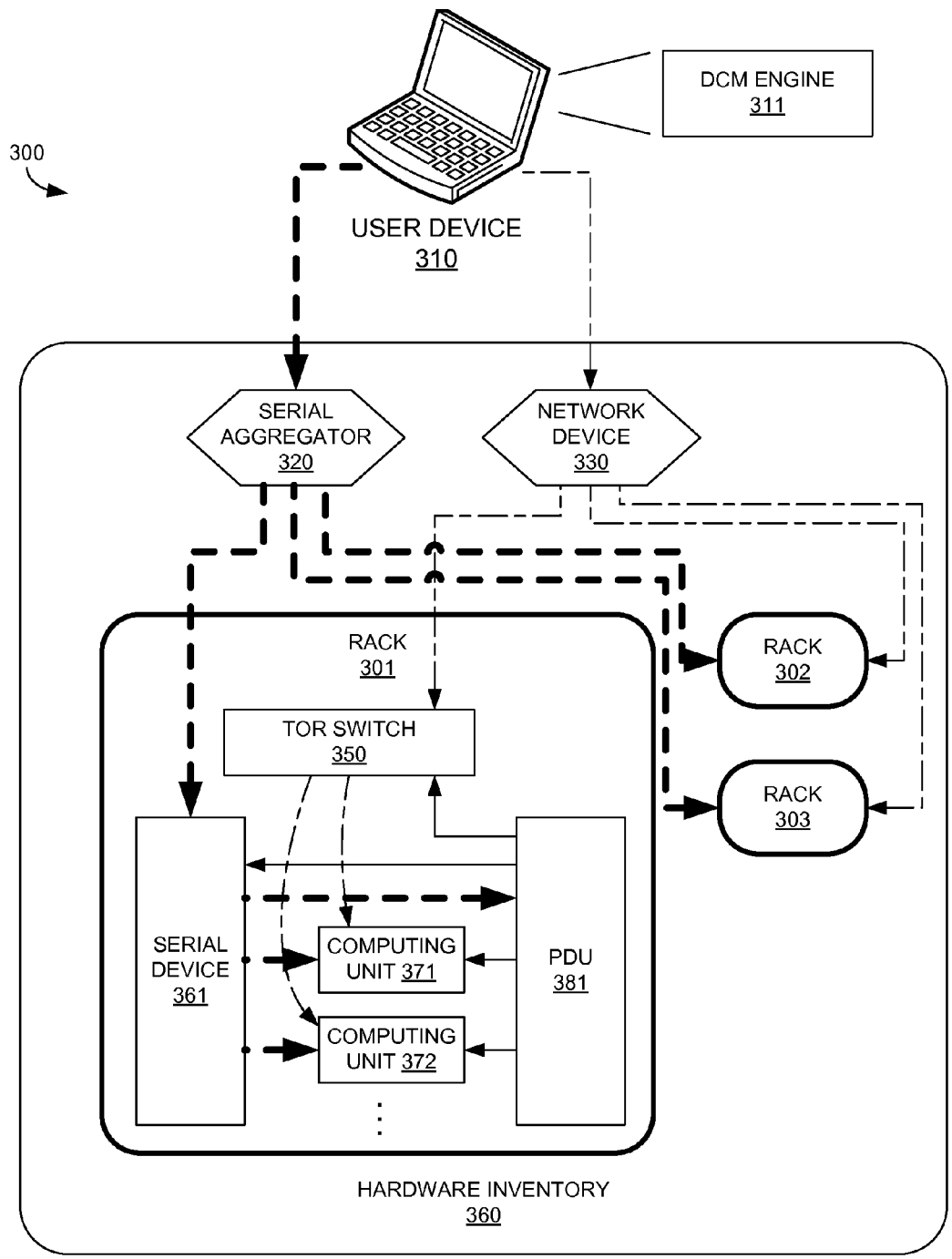
FIG. 3 is a graphical representation illustrating an exemplary deployment ecosystem for integrating a inventory of hardware within a data center, the deployment ecosystem being suitable for use in implementing embodiments of the present invention.

The deployment and provisioning phases (see blocks 240 and 250 of FIG. 2) are substantially directed to integrating hardware inventory and installing particular software within the hardware inventory. With reference to FIG. 3, a graphical representation illustrating an exemplary deployment ecosystem 300 for integrating a hardware inventory 360 within a data center (e.g., data center 820 of FIG. 8), in accordance with embodiments of the present invention. Initially, the deployment ecosystem 300 includes a user device 310 that is communicatively coupled with components of the hardware inventory 360. In an exemplary embodiment, the communicative coupling is organized into at least a network-based connection (shown as thin dashed lines) and a serial-based connection (shown as thick dashed lines). As illustrated in FIG. 3, the serial-based connection involves a communication path between the user device 310 and a serial aggregator 320, where the serial aggregator 320 is responsible for properly distributing instructions from the user device 310 to an appropriate serial device (e.g., by processing addresses carried within data packets streaming from the user device 310). For instance, the serial aggregator 320 may represent a hub-like mechanism that communicates with and talks to multiple serial devices (e.g., connects to multiple Digi® devices in multiple racks).

The network-based connection involves a communication path between the user device 310 and a TOR switch 350 via a network device 330. In one example, the network device may represent an L3 aggregator switch, where the L3 aggregator switch is responsible for properly delivering data packets from the TOR switches 350 to the user device 310 (e.g., aggregates data packets from multiple network devices). It should be noted that the network device 330 may be configured to aggregate and communicate with multiple TOR switches, where the network device serves as a parent node of the TOR switches and, occasionally, as a child node to other high-level routers.

In operation, the network device 330 may act as an uplink between an existing infrastructure and the hardware inventory 360. Accordingly, the network device 330 serves to selectively isolate the hardware inventory 360 from the rest of an existing infrastructure (e.g., data center), as well as the Internet. By ensuring that there is no broadcast traffic entering or leaving through the uplink, the network device 330 helps negate any impact upon external services currently running on the existing infrastructure.

In this way, the deployment ecosystem 300 may act in a self-contained manner that confines messaging to intercommunication between the user device 310 and the hardware inventory 360 in order to ensure proper isolation between the hardware inventory 360 being built out and an existing infrastructure. This isolation is useful in at least the following two respects: providing a higher reliability during the bootstrap process by limiting external interference; and ensuring any currently live hardware within the existing infrastructure is not impacted by the bootstrap process. In embodiments, the isolation is configured as a security boundary that serves as a virtual layer separating the existing infrastructure and the hardware inventory 360, which cannot be considered as trusted until each of the phases succeed. Accordingly, the bootstrap process itself does not depend on a security context of the existing infrastructure. Generally, during the final phases of the bootstrap process (prior to the validation and provisioning phase) the security credentials/tokens are set up.

Architecture of the Deployment Ecosystem

The configuration of the deployment ecosystem 300 will now be discussed. Initially the ecosystem 300 includes the user device 310 for linking to and controlling functionality of racks 301, 302, and 303 within the hardware inventory 360. With respect to the rack 301 (e.g., high-density rack), there exists one or more power-distribution units (PDUs) 381, blades (e.g., computing units 371 and 372), serial devices 361, and network devices (e.g., TOR switch 350). It should be noted that there may be additional TOR switches per rack (e.g., upper and lower TOR devices). The computing units 371 and 372 are designed to act as processors to carry out computing/storage tasks and are configured by OEM to individually generate data packets upon respectively receiving power. In one instance, the computing units 371 and 372 represent servers that are arranged and deployed within the rack 301. The PDUs are designed to selectively supply and aggregate power to the computing units 371 and 372. The TOR switch 350 is configured for sending data packets over the network-based connection, while the serial device 361 is configured for invoking generation of the data packets upon receiving instructions over the serial-based connection. In embodiments, the serial device 361 may be used to configure devices within the rack (e.g., PDUs, TOR switches, and blades).

The hardware inventory 360 may further include a serial aggregator 320 and a network device 330 that interconnect the racks 301-303 within the user device 310. The serial aggregator 320 aggregates and talks with multiple serial devices 361 of various racks 301 via serial communication channels (thick dashed lines). The network device 330 (e.g., aggregator switch) aggregates and talks with multiple TOR switches via network communication channels (thin dashed lines). As can be seen, the network equipment (e.g., network device 330 and TOR switch 350) and the serial routers (e.g., serial aggregator 320 and serial device 361) are generally organized in a tree-shaped topology, where there exists fewer connections when moving upward along the tree toward the user device 310.

The user device 310 includes deployment software (e.g., data-center manager (DCM) engine 311) that is designed to drive at least the deployment and provisioning phase of the bootstrap process. The deployment software is communicatively coupled to the TOR switch 350 via the network-based connection (in-band channel) and to the serial device 361 via the serial-based connection (out-of-band channel). In embodiments, the deployment and provisioning phase of the bootstrap process comprise: providing the user device 310 with the DCM engine 311 that is equipped to access a template file and triggering the DCM engine 311 to update a master service (MS) within the data center, where the MS helps integrate the FCC with the data center by allowing the FCC to interact with external resources of the data center. As discussed above, the template file includes attributes of the hardware inventory that are recorded during discovery and validation of the plurality of computing units.

Although various different configurations of network/serial devices 330 and 361 have been described, it should be understood and appreciated that other types of suitable devices and/or machines that distribute or aggregate messages may be used, and that embodiments of the present invention are not limited to the serial device 361 and TOR switch 350 described herein. For instance, multiple serial devices may be provided for the entire rack 301, where the serial devices act as a serial-access connection/interface to the PDU 381, and act as a serial connection/interface to each of the computing units 371 and 372. In another instance, a serial device 361 and the PDU 381 may be combined into a single device. In yet another instance, the TOR switch 350 may be replaced with a specialized blade that has Ethernet interface capability. Accordingly, the discovery and validation phase may be carried out using any number of network devices such that at least one network device includes in-band capabilities for network communication and at least one network device includes out-of-band capabilities for serial communication. Or, if the out-of-band capabilities are employed over the Ethernet, then a secondary network switch may be used in place of the serial device. In this way, the in-band capabilities compliment the out-of-band capabilities and allow for debugging and diagnosis of the network devices, as well as continued access to the computing units 371 and 372, if one of the capabilities fall offline.

It will be understood and appreciated by those of ordinary skill in the art that the ecosystem 300 shown in FIG. 3 is merely an example of one suitable portion of an environment for carrying out the deployment and provisioning phases of the bootstrap process and is not intended to suggest any limitation as to the scope of use or functionality of embodiments of the present invention. Nor should the ecosystem 300 be interpreted as having any dependency or requirement related to any single resource or combination of resources illustrated therein. Further, although the various blocks of FIG. 3 are shown with lines for the sake of clarity, in reality, delineating various components is not so clear, and metaphorically, the lines would more accurately be grey and fuzzy.

The hardware inventory 360 includes various equipment/resources interconnected to the user device 310 via serial-based connections and/or network-based connections. This equipment/resources, as described herein, may include software components (e.g., installed in the network devices) as well as tangible hardware elements, such as racks 301, 302, and 303 and the user device 310. The equipment/resources may be distributably placed across various physical resources in order to establish communication therebetween. In addition, a network (not illustrated) may be provided that facilitates this communication over channels connecting the equipment/resources, and any other elements required by the bootstrap process. The network may include, without limitation, one or more local area networks (LANs) and/or wide area networks (WANs). Such networking environments are commonplace in offices, enterprise-wide computer networks, intranets, and the Internet. Accordingly, the network is not further described herein.

The exemplary system architecture of the ecosystem 300 includes the user device 310 and the computing units 371 and 372. Each of these devices 310, 371 and 372, shown in FIG. 3, may take the form of various types of computing devices, such as, for example, computing device 100 described above with reference to FIG. 1. By way of example only and not limitation, the devices 310, 371 and 372 may be a personal computer, desktop computer, laptop computer, consumer electronic device, handheld device (e.g., personal digital assistant), various servers, blades, and the like. It should be noted, however, that the invention is not limited to implementation on such computing devices, but may be implemented on any of a variety of different types of computing devices within the scope of embodiments of the present invention.

Typically, each of the devices 310, 371 and 372 include, or is linked to, some form of a computing unit (e.g., central processing unit, microprocessor, etc.) to support operations of the component(s) running thereon (e.g., originating data packets upon receiving a signal or being supplied power). As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the devices 310, 371 and 372 to enable each device to perform communication-related processes and other operations. In another instance, the computing unit may encompass a processor (not shown) coupled to the computer-readable medium accommodated by each of the devices 310, 371 and 372. Generally, the computer-readable medium stores, at least temporarily, a plurality of computer software components that are executable by the processor. As utilized herein, the term "processor" is not meant to be limiting and may encompass any elements of the computing unit that act in a computational capacity. In such capacity, the processor may be configured as a tangible article that processes instructions. In an exemplary embodiment, processing may involve fetching, decoding, interpreting, executing, and writing back instructions (e.g., reconstructing the physical gestures by presenting animations of the motion patterns).

Also, beyond processing instructions, the processor may transfer information to and from other resources that are integral to, or disposed on, the devices 310, 371 and 372. Generally, resources refer to software and hardware mechanisms that enable the devices 310, 371 and 372 to perform a particular function. By way of example only, the resources may include one or more of the following mechanisms: deployment software (e.g., DCM engine 311); a template file; and components residing within the computing units 371 and 372.

Workflows of the Deployment and Provisioning Phases

The workflows of the bootstrapping process for deploying the hardware inventory 360 as the FCC 830 and for provisioning security on the FCC 830 will now be described with reference to FIG. 8. Initially, the user device 310 is provided with deployment software running thereon that is functional to carry out the deployment and provisioning phases of the overall bootstrap process. The user device 310 may be wired or wirelessly hooked up to the hardware inventory 360 via a serial-based connection and/or a network-based connection, which serve as the entry point for the user device 310 to integrate the hardware inventory 360 within the data center 820. The connectivity from the user device 310 may be performed directly or through additional network devices (not shown) to enable communication therebetween.

As used herein, the phrase "deployment software" is meant to generally refer to software that provides an efficient, robust, and scalable framework to incorporate a cloud-based operating system (e.g., Windows Azure) on a designated hardware inventory 360 regardless of the location. In one instance, the deployment software enables deployment of the hardware inventory 360 as a cloud-computing stamp (e.g., FCC 830) within a cloud-computing network (e.g., distributed data center 820). In embodiments, enabling deployment involves building up a non-configured hardware inventory 360 into a cloud-computing stamp, which is eventually incorporated into the fabric of the cloud-computing network. Accordingly, enabling deployment of the hardware inventory 360 may involve provisioning and validating the cloud-based operating system on the hardware inventory 360. In an exemplary embodiment, the cloud-based operating system includes the following: computing fabric (kernel space) and core infrastructure services (OS and/or application space), such as storage services, monitoring data services, domain name services, and frontend services.

As mentioned above, with respect to FIG. 3, the deployment software may include the DCM engine 311 running on the user device 310. In one embodiment, the DCM engine 311 may represent a portion of the fabric capable of managing hardware and devices. In another embodiment, the DCM engine 311 is programmed to drive workflows for installing and removing the hardware inventory 360 into and from the data center 820. These workflows may include enabling an existing fabric to scale out without a service interruption.

Further, the workflows may involve the DCM engine 311 accessing a template file that includes attributes of the hardware inventory 360 that are recorded during discovery and validation of a plurality of computing units therein. Discovery and validation is carried out during previous phases of the bootstrap process, where these phases involve discovering components on the blades and comparing attributes of the components against a template file, which serves as the blueprint of software and hardware expected to reside on the blades. The phases of the bootstrap process further involve verifying the components of the blades against the template file. For instance, the discovery and validation prepares the blade for deployment into the fabric, because the workflows ensure the blade is able to communicate properly with components (e.g., fabric controller) within the data center 820 in which the blades are to be merged. If the blades are not properly configured, then they will not be able to properly run the services thereon.

The user device 310 stores or has access to the template file. The template file is generally configured to include a definition of the expected physical topology of the hardware inventory 360, which describes the wiring between devices (e.g., wiring between the TOR switch 350 and the serial device 361). In one instance, the wiring of the hardware inventory 360 is defined in terms of a type of function (e.g., compute or storage) performed by the devices of the hardware inventory 360. Typically, the template file may be provided by a hardware vendor who originally inspected the hardware inventory 360 during a previous phase of the bootstrap process (e.g., initial set-up phase 210 of the bootstrap process of FIG. 2).

The information collected during these phases, such as the data recorded onto the template file, is accessible by the DCM engine 311. In another instance, while the user device 310 is discovering and validating blades and components of the blades within the rack, resultant information is being fed in real time to the DCM engine 311 for eventual use. Accordingly, the DCM engine 311 is aware of the configuration and attributes of the devices (e.g., blades, serial and network devices, and PDU) detected within the hardware inventory 360, as well as the physical and logical topology of the hardware inventory 360 itself.

Figure 4:
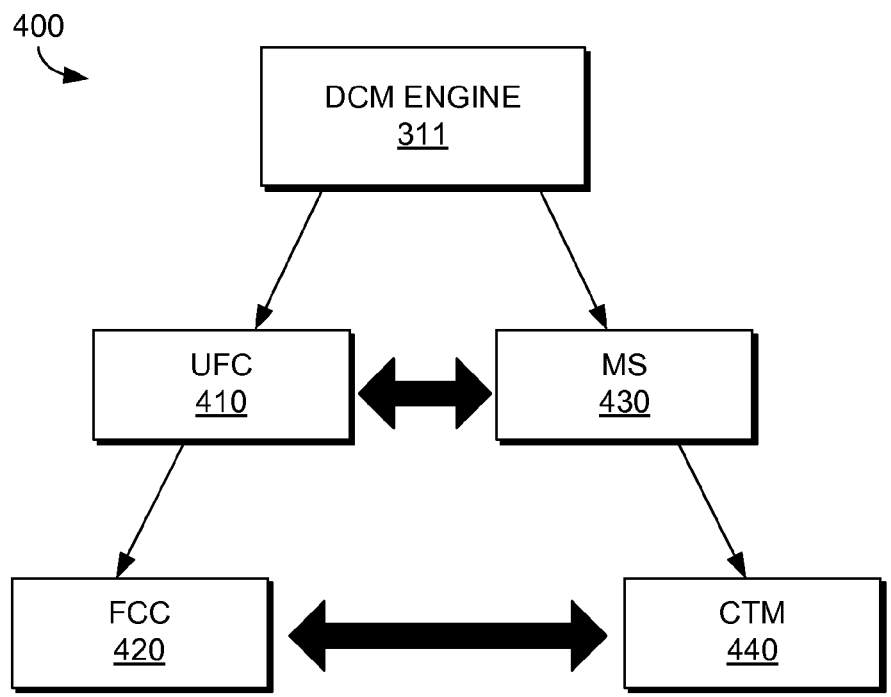
FIG. 4 is an exemplary schematic depiction showing a relationship between various components being deployed on the hardware inventory, in accordance with an embodiment of the present invention.

Turning now to FIG. 4, an exemplary schematic depiction 400 showing a relationship between various components being deployed on the hardware inventory 360 by the DCM engine 311 is shown, in accordance with an embodiment of the present invention. Initially, during deployment of the hardware inventory 360, the DCM engine 311 may carve out various components for managing differing levels of devices of the hardware inventory 360. These components include the following: master service (MS) 430 for managing a utility fabric cluster (UFC) 410; and the CTM 440 for managing an FCC 420.

Figure 8:
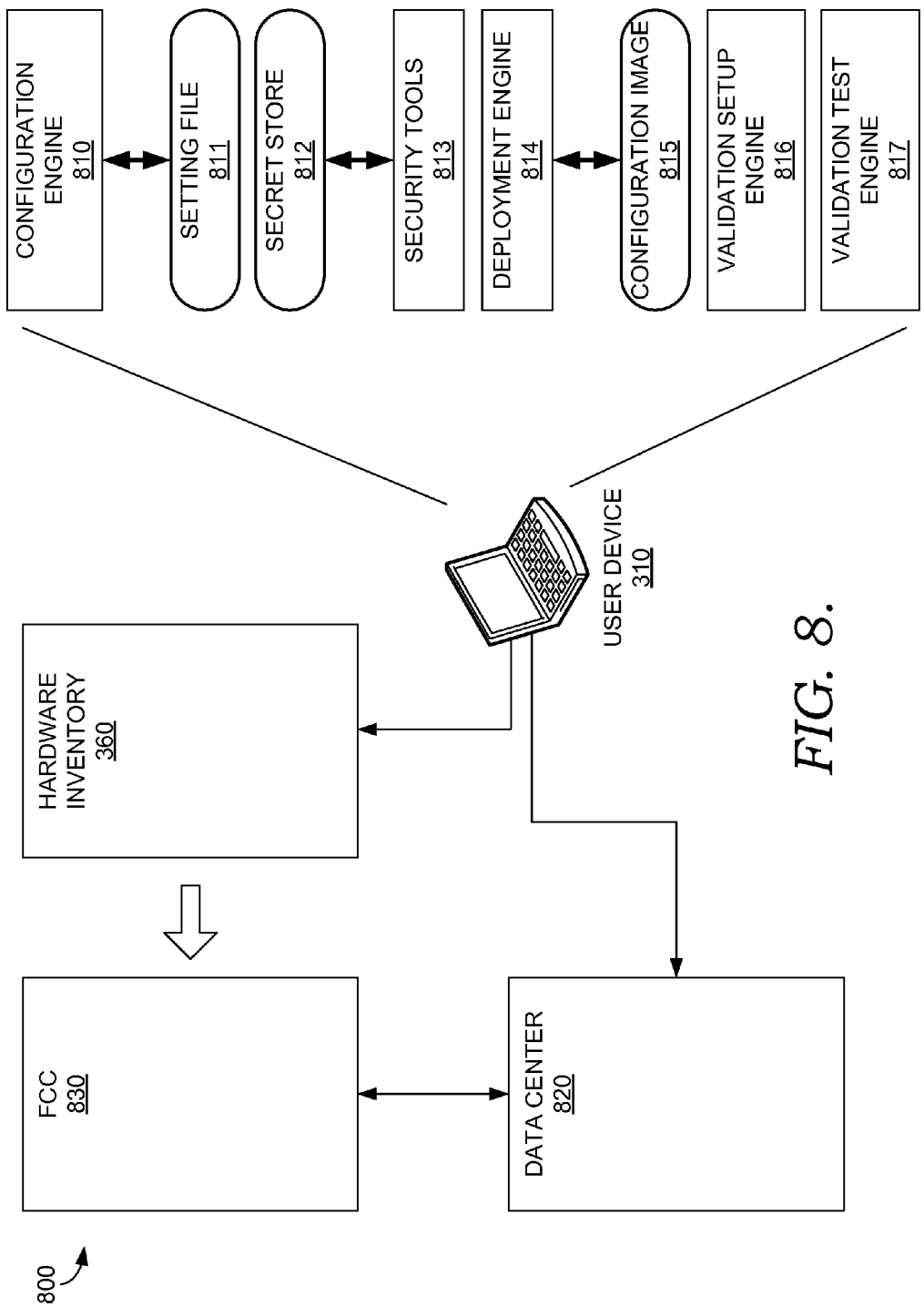
FIG. 8 is an operational diagram showing various components for securing and converting the hardware inventory to the FCC that interacts with the data center, in accordance with embodiments of the present invention.

In operation, upon deploying the MS 430, the MS 430 may have the ability to manage the FCC 830 of FIG. 8 along with other FCCs in the data center 820. This ability to manage the FCC 830 is due, in part, to the interaction of the DCM engine 311 between the hardware inventory 360 and the data center 820. As mentioned above, the DCM engine 311 represents deployment software running on the user device 310 that includes an API-based mechanism for accessing hardware-inventory information (e.g., XML schema and/or template file) and exporting the hardware-inventory information to the computing fabric of the data center 820 via the MS 430 running on the data center 820. In other words, the DCM engine 311 may be capable of logically transferring the hardware-inventory information directly into a preexisting MS 430 of the data center 820 by simply conveying the hardware-inventory information without further installation. Or the DCM engine 311 may be capable of populating the MS 430 with the hardware-inventory information when the MS 430 does not presently contain that information during deployment of the hardware inventory 360.

Figure 5:
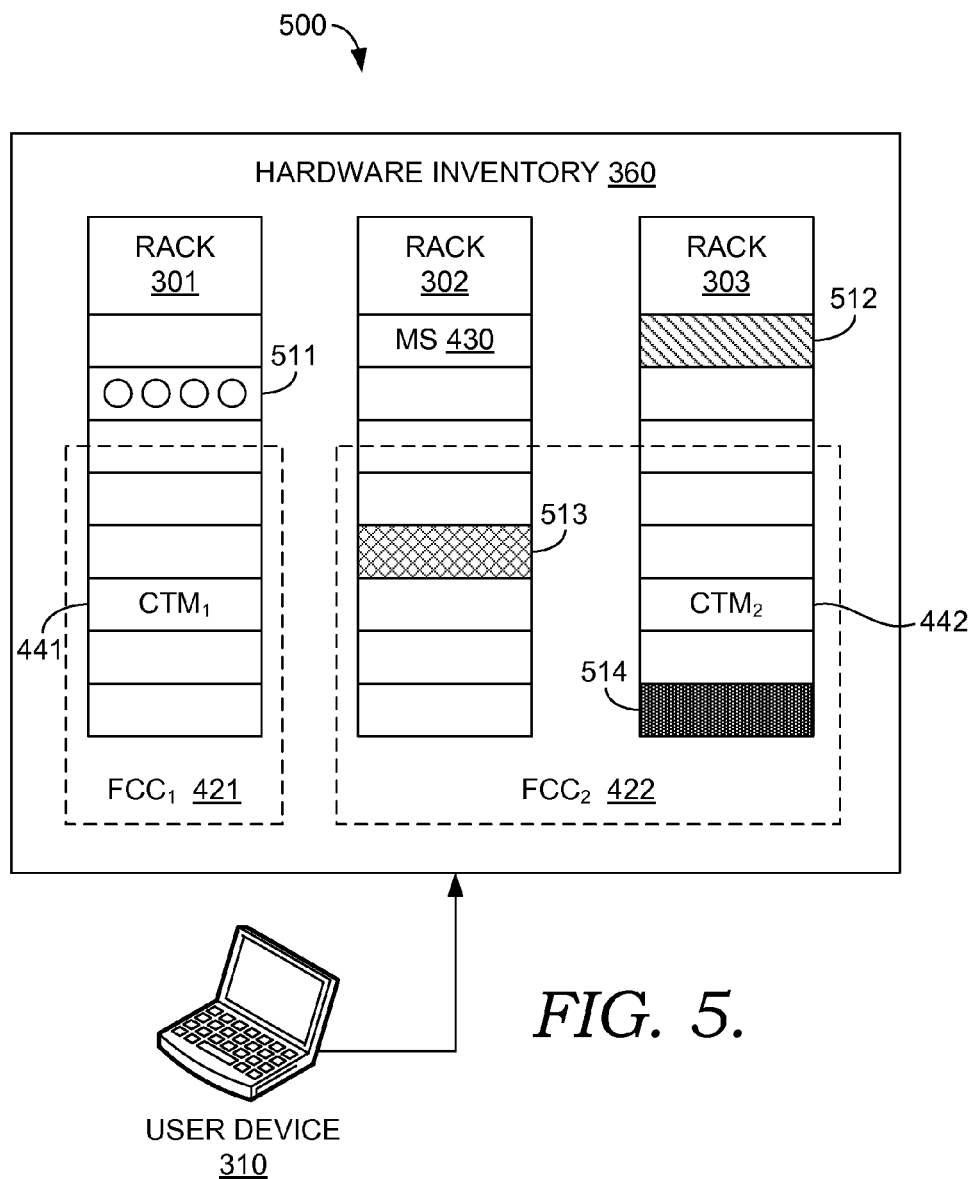
FIGS. 5-7 are a graphical representations illustrating exemplary systems for deploying various components within the hardware inventory, in accordance with embodiments of the present invention.
Figure 6:
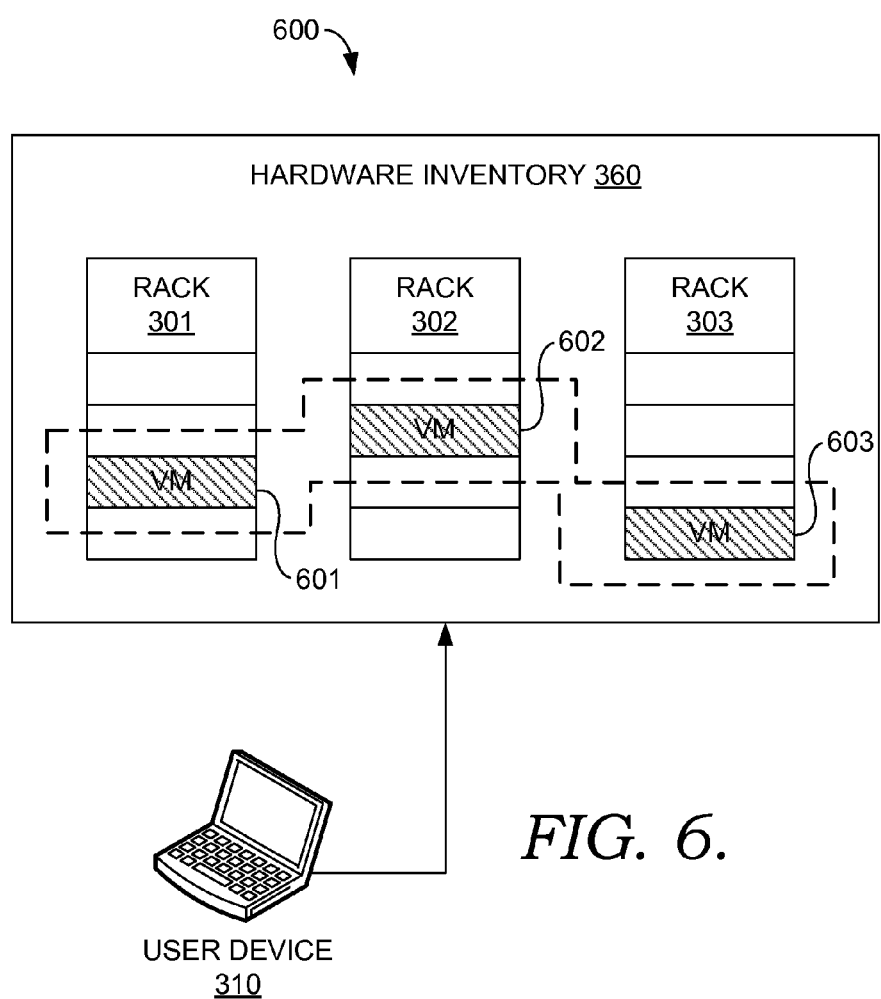
Figure 7:
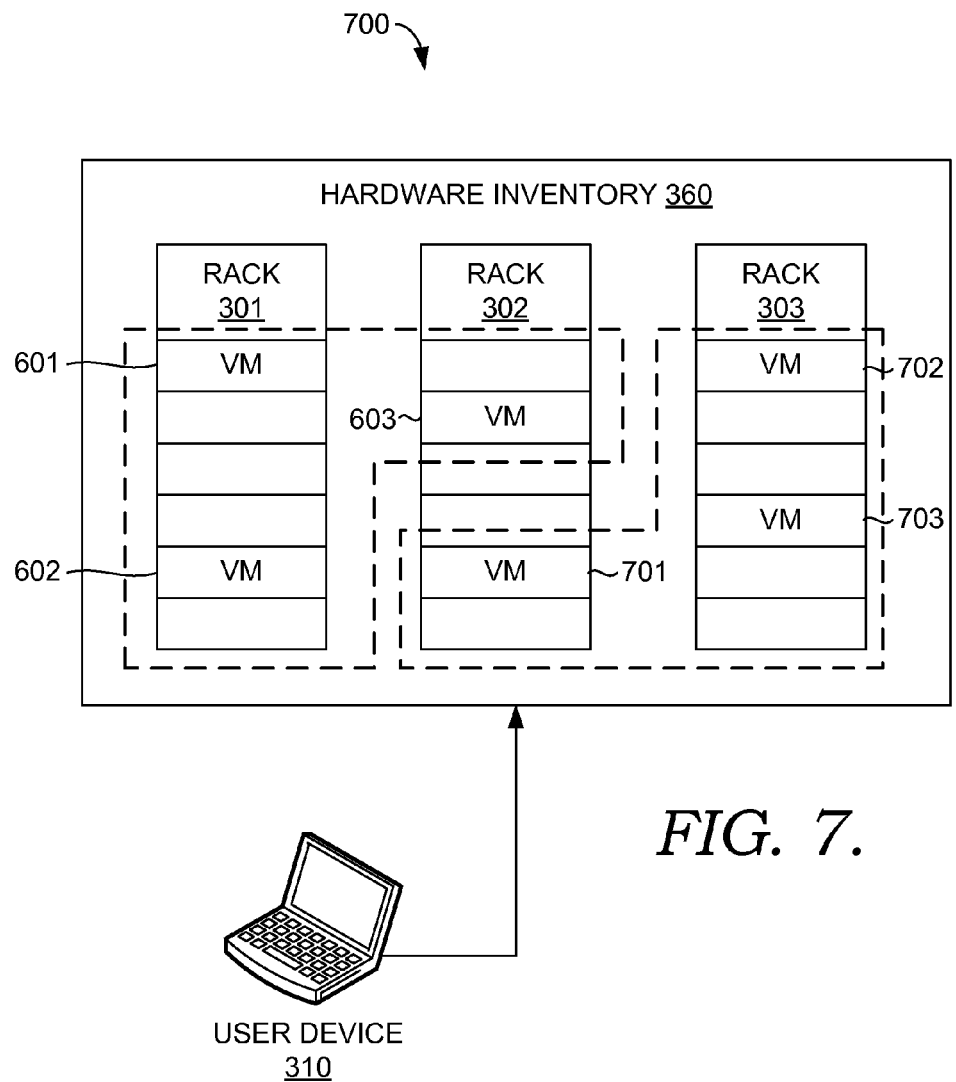

Turning now to FIGS. 5-7, graphical representations illustrating exemplary systems for deploying various components within the hardware inventory 360 are shown, in accordance with embodiments of the present invention. With respect to FIG. 5, the hardware inventory 360 is demonstrated as being deployed in subsets (e.g., portion of an overall rack), as opposed to all at once. In this way, as a subset is discovered and validated, the subset is deployed such that is available to the MS 430, which is deployed within the hardware inventory 360. The deployment of these subsets, such as $FCC_1$ 421 and $FCC_2$ 422, is then communicated to the MS 430. This communication alerts the MS 430 to begin managing the $FCC_1$ 421 and the $FCC_2$ 422 for hosting tenant applications and the like. Upon deploying the subsets of the hardware inventory 360 dynamically, as they are discovered and validated. Deployment of the CTMs may involve the DCM engine allocating portions for the hardware invention 360 to run the CTMs within the subsets. For example, with reference to FIG. 5, a portion of the hardware within the $FCC_1$ 421 is allocated to host and run $CTM_1$ 441 while a portion of the hardware within the $FCC_2$ 422 is allocated to host and run $CTM_2$ 442. Similar to the MS 430, the CTMs 441 and 442 are replicated on portions of the hardware inventory 360 and configured to interact with each other during production events. The remainder of the hardware inventory 360 is made available to run the customer's tenant applications.

In addition to the MS 430 and the CTMs 441 and 442, the DCM engine is programmed to provision the computing units within the hardware inventory 360 with software. In an exemplary embodiment, provisioning the software may include the following steps: deploying a computing fabric to hardware inventory such that the plurality of computing units therein interact as a unified logical system; and deploying core infrastructure services to run on top of the computing fabric. From an operating system's perspective, the computing fabric affects kernel space. For instance, the MS 430, the CTMs 441 and 442, and any other tools for assisting in running the core infrastructure services may be internal to the computing fabric. Also, from an operating systems perspective, the core infrastructure services represent operating-system-level components within the user space. These operating-system-level components serve to provide underlying support tenant applications running on the FCCs 421 and 422.

Examples of the operating-system-level components include storage services 511, monitoring data services (MDS) 512, domain name service (DNS) 513, and a frontend service 514. In embodiments, the storage services 511 assist in establishing and maintaining a file system. The MDS 512 is equipped to detect events within the FCCs 421 and 422 and to recognize and diagnose failures based upon the detected events. The DNS is configured to manage static and/or dynamic IP addresses of the blades of the racks within the hardware inventory 360, as well as to assign and record virtual IP addresses in association with tenant services running on the blades. The frontend service 514 is designed to provide the tenant services with an application programming interface (API) for allowing external devices to interact with the FCCs 421 and 422. That is, the frontend service 514 allows external devices (e.g., private enterprise network) to interact with tenant applications running on the hardware inventory by calling upon the APIs—making unassigned portions of the FCCs 421 and 422 available to the customers. It should be noted that there exists other core infrastructure services besides those illustrated and mentioned with respect to FIG. 5, such as software load balancers (SLBs), etc.

Turning to FIG. 8, an operational diagram of a system architecture 800 showing various components for securing and converting the hardware inventory 360 to an FCC 830 that interacts with the data center 820 is shown, in accordance with embodiments of the present invention. These various components include, but are not limited to, the following: configuration engine 810, security tools 813, deployment engine 814, validation setup engine 816, and validation test engine 817. These components may be part of or in communication with the DCM engine running on the user device 310. Or one or more of these components may be isolated from the DCM engine and run independently from the deployment phase of the bootstrap process.

Initially, upon provisioning the computing fabric and the core infrastructure services within the hardware inventory 360, the configuration engine 810 is equipped to configure the hardware inventory 360 by applying configuration settings. In one instance, the configuration engine 810 is equipped to apply a first set of configuration settings to the computing fabric. The first set of configuration settings represents general properties that are applied to many FCCs within the data center 820, thereby integrating the operation of the multiple FCCs into a common network.

In another instance, the configuration engine 810 is equipped to apply a second set of configuration settings to the core infrastructure services. The second set of configuration settings represents specific properties that are applied to an individual FCC 830. The second set of configuration settings may include environment-specific settings, hardware-specific settings, or tenant-specific settings that are applied to the core infrastructure services. The environment-specific settings determine whether the hardware inventory 360 is entering into production or still being tested. The hardware-specific settings are particular to whether the hardware inventory 360 is local to a production location, remote from a production location, a stand-alone data center, joining a computing fabric of a networked data center, and/or is the first FCC to run the computing fabric. The hardware-specific setting may also govern such things as the specific IP ranges for the FCC 830 and the amount of storage or compute capacity of the hardware inventory 360. The tenant-specific settings are provided to support the tenant services designated to run on the FCC 830. These tenant-specific settings are typically application-driven properties, such as identifiers of the endpoints, ranges of IP addresses, and names of VLANs.

In operation, the configuration engine 810 is equipped to receive the configuration settings as name/value pairs within a settings file 811. The configuration engine 810 may then convert human-readable name/value pairs into configuration settings of a computer-readable format (e.g., service description files) language, which is expected and understandable by the computing fabric deployed on the FCC 830. In one instance, the configuration may use configuration schemas to adapt the human-readable name/value pairs into a format of content-specific values that may be interpreted by the MS and/or CTMs.

The security tools 813 are generally configured for provisioning security measures within the hardware inventory 360 upon accessing a secret store 812. The secret store 812 represents one or more stand-alone mechanisms where confidential information is held and that interfaces with the security tools 813 on the user device 310. In this way, the secret store 812 does not need to have any dependency on the Internet or other publicly accessible network, thereby preserving the private nature of the confidential information stored within the secret store 812. In some embodiments, the secret store 812 may represent a centrally secured secret storage location that is accessed over the Internet.

Prior to deployment of the FCC 830, the secret store 812 employs a management API to manage confidential information generated on-the-fly while building out the hardware inventory 360 during the initial bootstrap-process phases. This confidential information (e.g., credentials for network and hardware devices, original certificates, private keys, passwords for serial-access devices, user names, access protocols, and other permissions) is written to the secret store 812 until the completion of the discovery and validation phase. In one instance, the confidential information is manually uploaded to the secret store 812 by a customer or administrator. In another instance, the confidential information is automatically imported into the secret store 812 from a credential authority.

During deployment, the secret store 812 may automatically transfer some confidential information to the security tools 813 to export to the MS or CTMs. The secret store 812 may transfer other confidential information to a highly available location for viewing by a custodian of the data center 820. This confidential information may be subsequently used by the custodian to debug the FCC 830 upon experiencing problems when integrated within the data center 820.

In one instance of operation, the security tools 813 ensure the integrity of the confidential information as it is being injected into proper locations of the hardware inventory 360. This secure transfer of the confidential information allows a tenant application running on the FCC 830 to encrypt and decrypt messages. It should be noted that the secure transfer of the confidential information may occur during or after deployment of the hardware inventory 360 as the FCC 830.

Upon successfully completing the injection of the confidential information into the FCC 830 and/or data center 820 using the security tools 813, the FCC 830 may be integrated within the data center 820. Integration may include replacing locally generated credential information (used to access network and hardware devices) employed during the build-out of the hardware inventory 360 with new secure credentials. In one instance, replacement of the credential information is performed by leveraging existing cloud-computing fabric processes for creating, auditing, and rotating security tokens on existing nodes. In this way, credential information that may have been shared with various parties (e.g., technicians, OEMs, curators, or administrators) while building out the hardware inventory 360 are decommissioned, thus, the FCC 830 is made more secure. It should be noted that, even upon integration, the user device 310 may be retained as a gateway device to service the core infrastructure services (e.g., MS and CTM) after the bootstrap process is complete.

The security tools 813 may also be tasked with provisioning an access-control list (ACL) for virtual IP addresses and provisioning the DNS within the FCC 830. For most tenant services, there exists an endpoint (e.g., accessible by external entities using a virtual IP address), which allows for accessing the tenant services. The endpoint is imparted with security measures in order to meter access thereto. For example, the security measures may invoke a rule that only external entities that are granted authority by the frontend service 514 of FIG. 5 may talk with the computing fabric during the bootstrap process. Enforcing the security measures may involve either manually changing permissions on the networking hardware inventory 360 to ensure only a select group of external entities have permission to access the endpoints or enforcing the security measures may involve the deployed computing fabric automatically applying the security measures (e.g., access policies) to the computing units or networking hardware of the hardware inventory 360. Automatically applying the security measures may involve the use of software-based LBs with programmable interfaces that allow for specifying which security measures are desirable and which endpoints to the computing fabric the specified security measures will be installed. In one instance, specifying the security measures includes setting up a range of virtual IP addresses to use within the ACL for a particular endpoint to a tenant service.

Using the security tools 813 to provision the DNS involves creating at least one entry into the DNS that corresponds with the ACL, where the entry maps a domain name to one or more virtual IP addresses of an endpoint. There may also be a certificate associated with the endpoint stored in the DNS. Thus, the DNS manages customer-to-tenant virtual IP address conversion for each of the endpoints to the tenant services running in the FCC 830.

Typically, for each tenant service, two types of endpoints exist: internal (within the computing fabric) and external (visible to public). In embodiments, dynamic IP (DIP) addresses are used for machine-level addressing dedicated to internal endpoints while the virtual IP (VIP) addresses are used for public-level addressing exposed publically for external endpoints. A hardware or a software-based LB may be used for mapping between a VIP and a DIP, in order to secure a range of IP addresses. Further, the LB may perform network-address translation to frustrate attacks on the internal functionality of the FCC 830.

The deployment engine 814 may run on the user device 310 or within the computing fabric of the FCC 830. Further, the deployment engine 814 may be called via an interface to instantiate deployment of the FCC 830, where the deployment engine 814 is responsible for driving end-to-end automation of various workflows within the bootstrap process including the execution of tools and mechanisms used for accomplishing the workflows inherent in scheduling deployments, managing deployments that are in-flight, and responding to any issues that occur. The deployment engine 814 conducts deployments by executing workflows against a running computing fabric, reporting on progress, escalating issues, and collecting metrics that can be used to drive deployment improvements over time.

In operation, the deployment engine 814 may be configured to execute a set of commands (in parallel or in serial) that performs a workflow for automatically deploying a configuration image 815 within the hardware inventory 360. The configuration image 815 may include a virtual hard disk (VHD) package and logical steps of the workflow to carry out deployment of the package. Upon consuming the configuration image 815, the deployment engine 814 may commence execution of the logical steps of the workflow. These logical steps involve pre-action (e.g., validation of the FCC 830 to ensure expected dependencies are met), action (e.g., deployment of the configuration image 815), and post-action (e.g., post-deployment validation).

Deployment of the configuration image 815 may be staged by levels of priority of the components being deployed. These prioritized components include (ordered from highest to lowest priority) core tenants, infrastructure tenants, and platform tenants. The core tenants help provide a functioning data center 820 and include services that enable general operation of the computing fabric. The core tenants include components that support inter-node communication capability, such as the DNS, MS, and CTMs. The infrastructure tenants help provide usability and availability of the FCC 830 and make it usable to run a tenant service. The infrastructure tenants include storage services 511 of FIG. 5 (e.g., XStore) that support finding data for customer accounts that are located remotely and that provide an interface for the customer to interact with the CTMs. The platform tenants help offer the customers options that are not necessarily required for operation of the data center 820. In embodiments, the platform tenants include attributes that correspond with definitions of the dependency schema, thus, helping to decide what software is to be run on the data center 820.

Upon completion of deployment of the configuration image 815, the hardware inventory 360 represents a new FCC 830 that is ready to be integrated with the balance of FCCs within the computing fabric of the data center 820. When integrating the FCC 830 to an existing data center 820, information (e.g., MAC addresses, configurations of the computing units in the hardware inventory 360, and the like) about the FCC 830 is conveyed to the data center 820 to merge the FCC 830 within a layout of the previously created clusters of the data center 820. Once integrated within the data center 820, the FCC 830 will serve as one of the clusters.

Initially, the process of integrating the FCC 830 involves preparing an infrastructure state from the information collected when verifying the physical topology of the hardware inventory 360. As used herein, the phrase "infrastructure state" is meant to broadly encompass any data that is useful to describe hardware and/or software properties presently exhibited by the network and hardware devices. In one particular example, the infrastructure state helps identify the utility of the hardware inventory as storage, compute, or hybrid of storage and compute, where the utility is based on such considerations as physical topology (e.g., high-profile blades are linked to ports with proper permissions for high-security storage purposes), configuration settings, and identity of the network and hardware devices. As such, infrastructure state ostensibly serves as an image of the software, configuration settings, and operating system installed within the hardware inventory 360 when it is built out to the FCC 830.

In operation, the infrastructure state is shared by the user device 310 with one or more components of the data center 820 when integrating the hardware inventory 360 within the computing fabric. In this way, the infrastructure state acts as an input that includes details of the hardware inventory 360 that enable a fabric controller to manage the hardware inventory 360 as an FCC 830 or cloud-computing stamp. For example, details may include MAC or IP addresses and configurations of the network and hardware devices, locations of particular devices, port connections between devices and PDUs, and other information needed to manage the FCC 830.

The validation setup engine 816 and the validation test engine 817 are configured to work in cooperation to perform post-deployment validation of the FCC 830. Generally, when moving from one phase of the bootstrap process to the next, confirmation is made to ensure prerequisites of each phase are met. That is, the resultant output of each phase typically leaves the hardware inventory 360 in condition for the next phase to commence without difficulty. For example, if the resultant output of the deployment of the computing fabric does not allow sufficient access to the computing units by the CTMs, then an issue is detected and remediation prior to progressing to the next phase is triggered. Although each phase of the bootstrap process may include a validation as part of its workflows, a comprehensive fabric-wide validation is performed upon the end of the build-out of the hardware inventory 360.

The comprehensive fabric-wide validation ensures the hardware of the FCC 830 is ready for use by running a suite of tests such that different tests are conducted against different subsystems from many locations. These locations may include the following: the user device 310 to transform the connection into the disaster-recovery entry point; fabric controller(s) of the data center 820 to verify the FCC 830 is internally reachable; external entities (e.g., corporate network) to determine whether the FCC 830 is externally reachable (e.g., over the Ethernet); and specialized entities as requested by customers.

Initially, when carrying out the suite of tests for validation of the FCC 830, the validation setup engine 816 is instructed to implement a workflow whose built-in features (e.g., remote execution, run-as, pause and resume) may be exploited to perform tasks (e.g., tenant deployments or network configuration). As such, the validation setup engine 816 may borrow and reuse existing workflows for setting up and verifying proper functionality of a test-based tenant service, or "canary tenant," to validate that the deployment and configuration of the FCC 830 was successful. Typically, the canary tenant exhibits characteristics of at least one tenant service to be hosted by the hardware inventory 360 when operating as the FCC 830 of the data center 820. In embodiments, validating a configuration and deployment of an FCC 830 may comprise the following steps: deploying a computing fabric on the hardware inventory 360 (as mentioned above); generating the artifacts for a canary tenant to be installed within the computing fabric of the hardware inventory 360; deploying the canary tenant within the hardware inventory 360; assigning a range of DIP and VIP addresses to a canary tenant; and testing operation of the canary tenant using the addresses to ensure proper functionality within a physical and logical topology of the hardware inventory 360.

Turning to FIGS. 6 and 7, schemes for deploying the canary tenants will now be discussed. With respect to FIG. 6, a scenario 600 is depicted where a multi-instance scheme is employed by the validation setup engine 816. The multi-instance scheme involves distributing many replications of a single instance of a role of a canary tenant (e.g., VMs 601-603) across many computing units (e.g., servers on racks 301-303) of the hardware inventory 360. These single role instances are then tested to ensure the physical and logical topology of the hardware inventory 360 allows for proper functionality. In one example, testing may involve verifying that the network and LB settings allow for communication with each of the VMs 601-603 and, thus, validating that each of the racks 301-303 is reachable.

With respect to FIG. 7, a scenario 700 is depicted where a multi-tenant scheme is employed by the validation setup engine 816. The multi-tenant scheme (e.g., multiple tenants where each tenant has multiple roles) involves distributing many replications of instances of canary tenants (e.g., VMs 601-603 and 701-703) across many computing units (e.g., servers on racks 301-303) of the hardware inventory 360. These different tenant instances are then tested to ensure the physical and logical topology of the hardware inventory 360 allows for proper functionality of at least a first tenant service (e.g., VMs 601-603) and a second tenant service (e.g., VMs 701-703) running on the same hardware inventory 360.

Turning now to FIG. 8, the validation test engine 817 is configured to test the canary tenants once generated and distributed by the validation setup engine 816. When testing, the validation test engine 817 generally employs a test framework with inbuilt features (e.g., data-driven testing, attribute-based test execution, multi-platform test execution, and multi-mode test execution) that permit performing a wide variety of tests in different modes. Initially, the validation test engine 817 is configured to inject tools into the computing units (e.g., blades of racks 301-303 of FIG. 7) of the hardware inventory 360. These injected tools are configured to determine whether there are computing-unit failures when the hardware inventory 360 is being used in a way similar to production. If improperly configured, the hardware inventory 360 may exhibit corollary failures that may be addressed before being released for customer use.

The tools being injected by the validation test engine 817 may be selected based on, in part, a SKU definition developed for the hardware inventory 360, the template file, or any other information collected during the bootstrap process. Further, the injected tools may comprise an OEM-based package or a custom-built package. In operation, the injected tools may run various tests with or without the canary tenants. In one instance, the injected tools may run smoke tests, which include checks of how the hardware and software installed on the hardware inventory 360 will interact with services running on the computing fabric of the data center 820. In another instance, the injected tools may run burn-in tests, which include extended stress tests that exhaust the compute capacity and various resources such as network bandwidth, etc. of the hardware inventory 360 to determine whether servers/blades generate failures upon becoming physically hot. In this test, the position of the servers/blades in the rack is being checked, thus, the validation test engine 817 is able to detect short-term failures in the servers/blades before allowing deployment of the FCC 830 into the data center 820.

In yet another instance, the injected tools may run a matrix of tests by making calls from various locations (e.g., internal and external to the hardware inventory 360) while checking various behaviors that occur in response to the calls. In one instance, the calls invoke positive operations to check such attributes as availability, latency, and security. In another, the calls invoke negative operations, or design-to-fail tests, from different locations. By specifying and running the tests from various locations, the validation test engine 817 may control which locations are selected for each test, thereby diagnosing a failure by differentiating the location whose call caused the failure.

It should be noted that the exemplary system architecture 800 of FIG. 8 is but one example of a suitable environment that may be implemented to carry out aspects of the present invention and is not intended to suggest any limitation as to the scope of use or functionality of the invention. Nor should the illustrated system architecture 800 be interpreted as having any dependency or requirement relating to any one or combination of the components 810-817 as illustrated. In some embodiments, one or more of the components 810-817 may be implemented as stand-alone devices or as services or executable(s). In other embodiments, one or more of the components 810-817 may be integrated directly into the data center 820, FCC 830, and/or the user device 310. It will be understood by those of ordinary skill in the art that the components 810-817 illustrated in FIG. 8 are exemplary in nature and in number and should not be construed as limiting. It should be noted that deployment may be carried out without any of the specific components listed above, but with replacement processes that provide similar functions.

Accordingly, any number of components may be employed to achieve the desired functionality within the scope of embodiments of the present invention. Although the various components of FIG. 8 are shown with lines for the sake of clarity, in reality, delineating various components is not so clear, and metaphorically, the lines would more accurately be grey or fuzzy. Further, although some components of FIG. 8 are depicted as single blocks, the depictions are exemplary in nature and in number and are not to be construed as limiting (e.g., although only one secret store 812 is shown, many more may be communicatively coupled to other user devices that are performing the bootstrap process on other hardware inventories).

Process Flows

Figure 9:
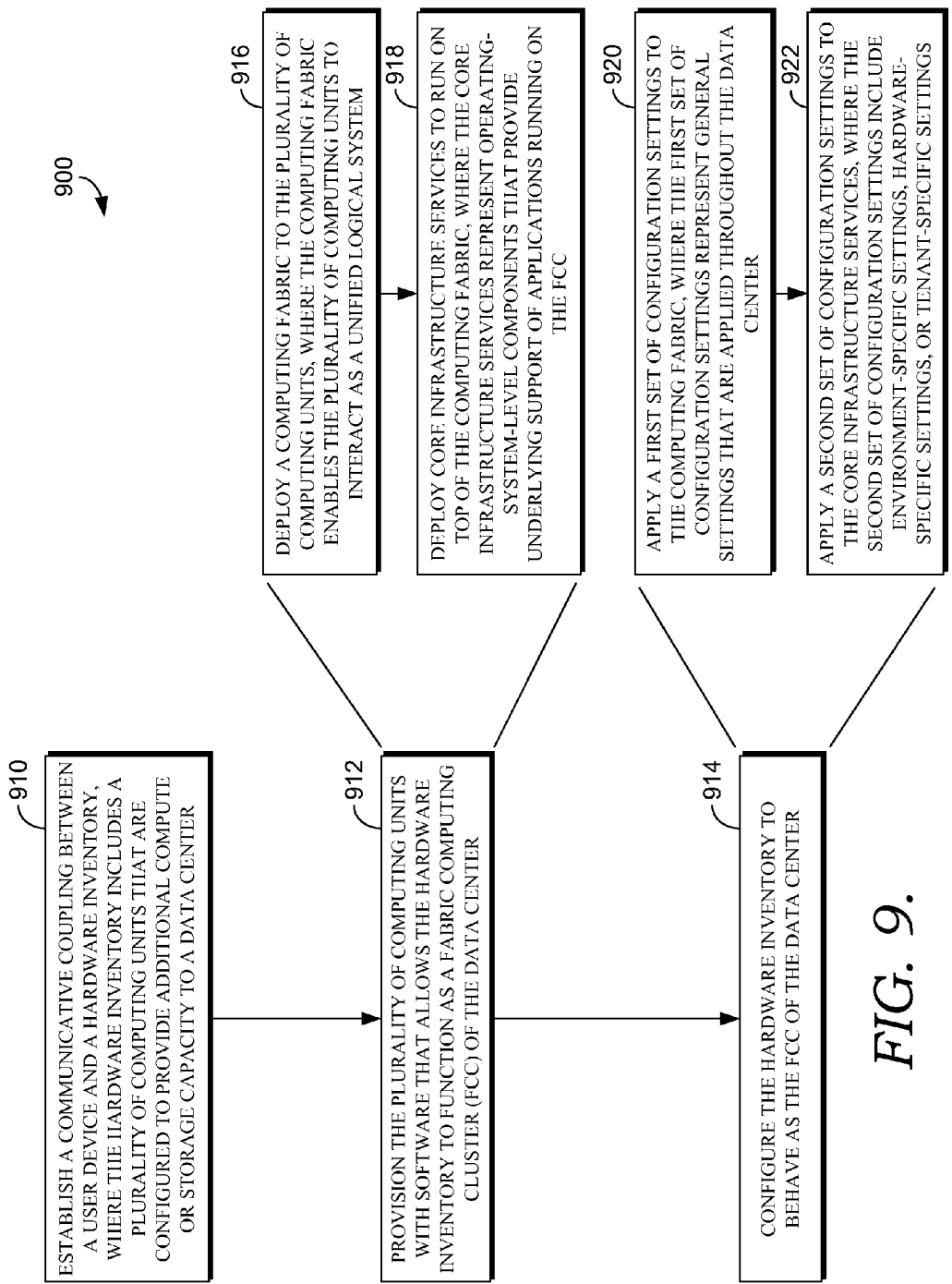
FIG. 9 is a flow diagram showing an overall method converting a hardware inventory into the FCC, in accordance with an embodiment of the present invention.

Referring now to FIG. 9, a flow diagram is shown that illustrates an overall method 900 for converting the hardware inventory into the FCC, in accordance with an embodiment of the present invention. Although the terms "step" and/or "block" may be used herein to connote different elements of methods employed, the terms should not be interpreted as implying any particular order among or between various steps herein disclosed unless and except when the order of individual steps is explicitly described. Initially, the hardware inventory represents a rack, where the rack may include a network device (e.g., TOR switch) and a set of computing units (e.g., set of blades inserted into the rack). The set of blades are typically interconnected between the serial-access device and the TOR switch.

Initially, the method 900 of FIG. 9 involves establishing a communicative coupling between a user device and a hardware inventory, as indicated at block 910. Typically, the hardware inventory includes a plurality of computing units that are configured to provide additional compute or storage capacity to a data center. As indicated at block 912, the plurality of computing units provisioning with software that allows the hardware inventory to function as an FCC of the data center. In embodiments, provisioning comprises deploying a computing fabric to the plurality of computing units (see block 916) and deploying core infrastructure services to run on top of the computing fabric (see block 918). In one instance, the computing fabric enables the plurality of computing units to interact as a unified logical system, while the core infrastructure services represent operating-system-level components that provide underlying support of applications running on the FCC.

As indicated at block 914, the method 900 further involves configuring the hardware inventory to behave as the FCC of the data center. In embodiments, configuring comprises applying a first set of configuration settings to the computing fabric (see block 920) and applying a second set of configuration settings to the core infrastructure services (see block 922). In instances, the first set of configuration settings represents general settings that are applied throughout the data center, while the second set of configuration settings includes particularized settings, such as environmental-specific settings, hardware-specific settings, and tenant-specific settings.

Figure 10:
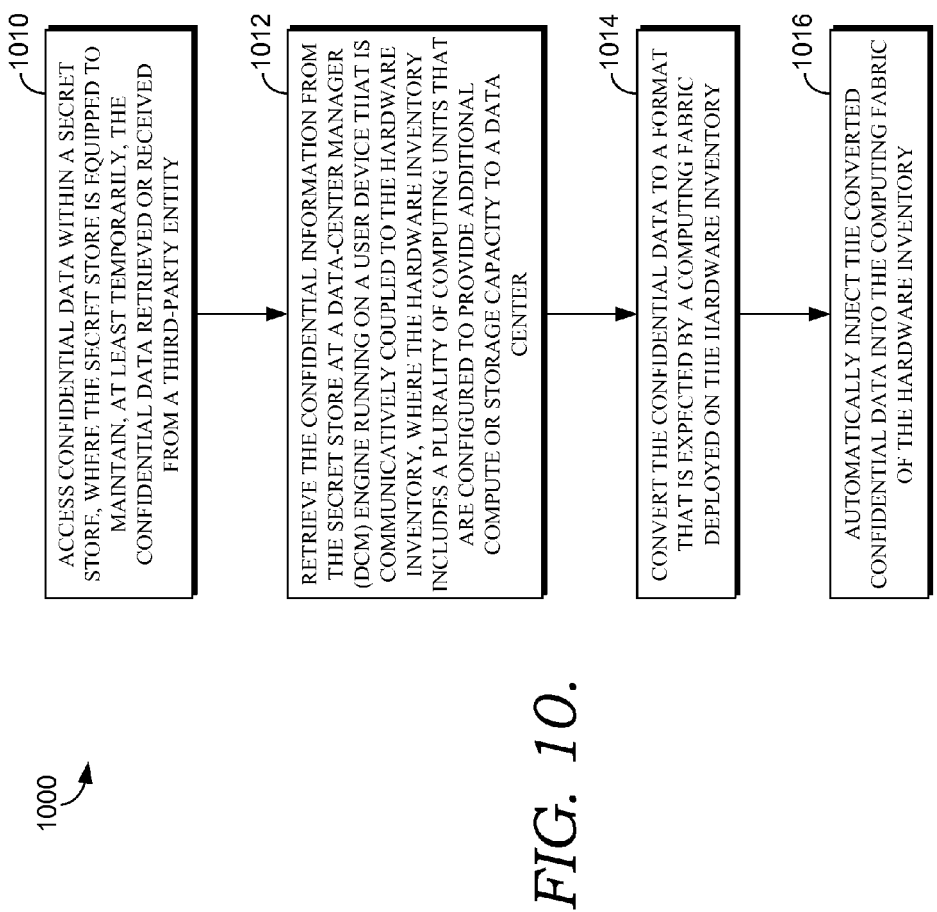
FIG. 10 is a flow diagram showing an overall method for discovering and validating one or more components internal to a server of an inventory of hardware, in accordance with an embodiment of the present invention.

Turning to FIG. 10, a flow diagram showing an overall method 1000 for provisioning security measures within the hardware inventory will now be described, in accordance with embodiments of the present invention. The method 1000 of FIG. 10 involves the step of accessing confidential data within a secret store, as indicated at block 1010. Typically, the secret store is equipped to maintain, at least temporarily, the confidential data retrieved or received from a third-party entity (e.g., customer, administrator, custodian of the data center, or credential authority). In other embodiments, the store secret represents a long-term repository for confidential information within a secret-store service, where a version of the service may represent a standalone unit running on the device 310 that manages secrets during bootstrap. In yet other embodiments, bootstrap process may use the standalone version of the service, or a remote service if reachable.

As indicated at block 1012, the confidential information is retrieved from the secret store by a DCM engine running on a user device. The user device is communicatively coupled to the hardware inventory via a serial and/or network connection. The hardware inventory generally includes a plurality of computing units that are configured to provide additional compute or storage capacity to a data center. The DCM engine is configured to convert the confidential data to a format that is expected by a computing fabric deployed on the hardware inventory, as indicated at block 1014. Further, the DCM engine is configured for automatically injecting the converted confidential data into the computing fabric of the hardware inventory, as indicated at block 1016.

Embodiments of the present invention have been described in relation to particular embodiments, which are intended in all respects to be illustrative rather than restrictive. Alternative embodiments will become apparent to those of ordinary skill in the art to which embodiments of the present invention pertain without departing from its scope.

From the foregoing, it will be seen that this invention is one well adapted to attain all the ends and objects set forth above, together with other advantages, which are obvious and inherent to the system and method. It will be understood that certain features and subcombinations are of utility and may be employed without reference to other features and subcombinations. This is contemplated by and is within the scope of the claims.

What is claimed is:

1. One or more hardware memory media devices having computer-executable instructions embodied thereon that, when executed, perform a method for converting a hardware inventory into a fabric-computing cluster (FCC), the method comprising:

establishing a communicative coupling between a user device and the hardware inventory, wherein the hardware inventory includes a plurality of computing units that are configured to provide additional compute or storage capacity to a data center, wherein the user device includes a data-center manager (DCM) engine that is provided access to a template file, wherein the template includes attributes of the hardware inventory that are recorded during discovery and validation of the plurality of computing units;

provisioning the plurality of computing units with software that allows the hardware inventory to function as an FCC of the data center, wherein provisioning the plurality of computing units is based at least in part on the template file that includes a physical and logical topology of the hardware inventory, wherein provisioning comprises:

(a) deploying a computing fabric to the plurality of computing units, wherein the computing fabric enables the plurality of computing units to interact as a unified logical system; and (b) deploying core infrastructure services to run on top of the computing fabric, wherein the core infrastructure services represent operating-system-level components that provide underlying support of applications running on the FCC; and configuring the hardware inventory to behave as the FCC of the data center, wherein configuring comprises applying a first set of configuration settings to the computing fabric.

2. The media of claim 1, wherein configuring further comprises applying a second set of configuration settings to the core infrastructure services.

3. The media of claim 1, wherein establishing a communicative coupling between a user device and the hardware inventory involves providing a network connection or a serial connection between the user device and the hardware inventory.

4. The media of claim 1, wherein deploying core infrastructure services to run on top of the computing fabric comprises deploying storage services to assist in establishing and maintaining redundant storage for binary and text data, messages, and structured data in a cloud file system.

5. The media of claim 1, wherein deploying core infrastructure services to run on top of the computing fabric comprises deploying monitoring data services to detect events within the FCC, and to recognize failures based upon the detected events.

6. The media of claim 1, wherein deploying core infrastructure services to run on top of the computing fabric comprises deploying a domain name service to manage IP addresses of the plurality of computing units within the FCC.

7. The media of claim 1, wherein deploying core infrastructure services to run on top of the computing fabric comprises deploying a frontend service that provides an application programming interface (API) for allowing external devices to interact with the FCC and deploying other core infrastructure services that run on top of the computing fabric.

8. The media of claim 1, wherein the user device selectively isolates the hardware inventory from an existing infrastructure of the data center to cause the hardware inventory to operate in a self-contained manner that confines messaging to intercommunication to intercommunication between the user device and the hardware inventory.

9. The media of claim 1, wherein the DCM engine is configured to update a master service (MS) within the data center, wherein the MS integrates the FCC with the data center by allowing the FCC to interact with external resources of the data center.

10. The media of claim 1, wherein the first set of configuration settings represents general settings that are applied throughout the data center.

11. The media of claim 1, wherein a second set of configuration settings represents specific settings that comprise at least one of environment-specific settings, hardware-specific settings, or tenant-specific settings.

12. A computerized method for provisioning security measures within a hardware inventory, the method comprising:

accessing confidential data within a secret store, wherein the secret store is equipped to maintain, at least temporarily, the confidential data retrieved or received from a third-party entity;

retrieving the confidential information from the secret store at a data-center manager (DCM) engine running on a user device that is communicatively coupled to the hardware inventory, wherein the hardware inventory includes a plurality of computing units that are configured to provide additional compute or storage capacity to a data center;

converting the confidential data to a format that is expected by a computing fabric deployed on the hardware inventory; and automatically injecting the converted confidential data into the computing fabric of the hardware inventory.

13. The computerized method of claim 12, wherein the computing fabric is configured to convey the converted confidential data to a tenant application running on one or more of the plurality of computing units of the hardware inventory, wherein the converted confidential data is employed to encrypt and decrypt messages leaving and entering, respectively, the tenant application.

14. The computerized method of claim 12, wherein confidential data comprises at least one of certificates, public keys, device credentials, user names, access protocols, or administrator-created passwords.

15. The computerized method of claim 12, further comprising, upon integrating the hardware inventory into the data center as a fabric-computing cluster (FCC), replacing the converted confidential data with production credentials.

16. The computerized method of claim 15, further comprising initiating distribution of the production credentials to a centralized location within the data center.

17. The computerized method of claim 12, wherein the third-party entity represents a customer that manually uploads the confidential data to the secret store.

18. The computerized method of claim 12, wherein the third-party entity represents an administrative service that automatically exports the confidential data to the secret store.

19. The computerized method of claim 12, wherein the secret store represents a stand-alone, protected data store or a remote service that supports a management application programming interface (API) that retrieves and receives the confidential data.

20. A computer system for performing a method to integrate a hardware inventory within a data center, the computer system comprising:

a hardware inventory comprising a plurality of computing units; and a user device, communicatively coupled to the hardware inventory, that is programmed to provision the plurality of computing units with software that allows the hardware inventory to function as a fabric-computing cluster (FCC) of the data center, wherein provisioning comprises deploying a computing fabric to the plurality of computing units such that the plurality of computing units to interact as a unified logical system, and deploying core infrastructure services to run on top of the computing fabric, wherein the core infrastructure services represent operating-system-level components that provide underlying support tenant applications running on the FCC, the user device further configured to apply environment-specific settings, hardware-specific settings, or tenant-specific settings to the core infrastructure services.

* * * * *